(12) United States Patent
Liao et al.

(10) Patent No.: US 11,024,923 B2
(45) Date of Patent: Jun. 1, 2021

(54) ELECTROCHEMICAL CELLS COMPRISING SHORT-CIRCUIT RESISTANT ELECTRONICALLY INSULATING REGIONS

(71) Applicant: Sion Power Corporation, Tucson, AZ (US)

(72) Inventors: Zhaohui Liao, Tucson, AZ (US); Chariclea Scordilis-Kelley, Tucson, AZ (US); Tracy Earl Kelley, Tucson, AZ (US); Clellie Winter, Tucson, AZ (US); Michael G. Laramie, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 557 days.

(21) Appl. No.: 15/916,588

(22) Filed: Mar. 9, 2018

(65) Prior Publication Data
US 2018/0261820 A1    Sep. 13, 2018

Related U.S. Application Data

(60) Provisional application No. 62/469,184, filed on Mar. 9, 2017.

(51) Int. Cl.
*H01M 50/449* (2021.01)
*H01M 50/411* (2021.01)
(Continued)

(52) U.S. Cl.
CPC ........... *H01M 50/449* (2021.01); *H01M 4/38* (2013.01); *H01M 4/382* (2013.01); *H01M 4/405* (2013.01);
(Continued)

(58) Field of Classification Search
CPC .................................................. H01M 2/1686
See application file for complete search history.

(56) References Cited

U.S. PATENT DOCUMENTS

| 4,664,991 A | 5/1987 | Perichaud et al. |
| 4,739,018 A | 4/1988 | Armand et al. |

(Continued)

FOREIGN PATENT DOCUMENTS

| WO | WO 99/33125 A1 | 7/1999 |
| WO | WO 99/33130 A1 | 7/1999 |

(Continued)

OTHER PUBLICATIONS

Alamgir et al., Lithium Batteries, New Materials, Developments and Perspectives, Chapter 3. Elsevier, Amsterdam. 1994; 93-136.

(Continued)

*Primary Examiner* — Brian R Ohara
(74) *Attorney, Agent, or Firm* — Wolf, Greenfield & Sacks, P.C.

(57) ABSTRACT

The present disclosure is related to electrochemical cells and associated methods. According to certain embodiments, the electrochemical cells comprise an electronically insulating region. In some embodiments, the electronically insulating region can be mechanically compliant. In some embodiments, the insulating region may comprise multiple layers (e.g., mechanically separable layers). The use of such arrangements can, according to certain embodiments, reduce the degree to which the electronically insulating region is breached by lithium dendrite growth.

30 Claims, 10 Drawing Sheets

(51) Int. Cl.
*H01M 4/38* (2006.01)
*H01M 4/40* (2006.01)
*H01M 10/052* (2010.01)
*H01M 10/0525* (2010.01)
*H01M 4/04* (2006.01)
*H01M 4/1395* (2010.01)
*H01M 4/02* (2006.01)

(52) U.S. Cl.
CPC ..... *H01M 10/052* (2013.01); *H01M 10/0525* (2013.01); *H01M 50/411* (2021.01); *H01M 4/0426* (2013.01); *H01M 4/1395* (2013.01); *H01M 2004/027* (2013.01); *H01M 2300/0037* (2013.01)

(56) References Cited

U.S. PATENT DOCUMENTS

| | | | |
|---|---|---|---|
| 4,833,048 A | 5/1989 | De Jonghe et al. |
| 4,917,974 A | 4/1990 | De Jonghe et al. |
| 5,162,175 A | 11/1992 | Visco et al. |
| 5,194,341 A | 3/1993 | Bagley et al. |
| 5,324,599 A | 6/1994 | Oyama et al. |
| 5,441,831 A | 8/1995 | Okamoto et al. |
| 5,516,598 A | 5/1996 | Visco et al. |
| 5,529,860 A | 6/1996 | Skotheim et al. |
| 5,601,947 A | 2/1997 | Skotheim et al. |
| 5,648,187 A | 7/1997 | Skotheim |
| 5,690,702 A | 11/1997 | Skotheim et al. |
| 5,723,230 A | 3/1998 | Naoi et al. |
| 5,783,330 A | 7/1998 | Naoi et al. |
| 5,792,575 A | 8/1998 | Naoi et al. |
| 5,882,819 A | 3/1999 | Naoi et al. |
| 5,919,587 A | 7/1999 | Mukherjee et al. |
| 5,961,672 A | 10/1999 | Skotheim et al. |
| 6,117,590 A | 9/2000 | Skotheim et al. |
| 6,153,337 A | 11/2000 | Carlson et al. |
| 6,201,100 B1 | 3/2001 | Gorkovenko et al. |
| 6,238,821 B1 | 5/2001 | Mukherjee et al. |
| 6,306,545 B1 | 10/2001 | Carlson et al. |
| 6,733,924 B1 | 5/2004 | Skotheim et al. |
| 6,797,428 B1 | 9/2004 | Skotheim et al. |
| 6,936,381 B2 | 8/2005 | Skotheim et al. |
| 7,247,408 B2 | 7/2007 | Skotheim et al. |
| 7,688,075 B2 | 3/2010 | Kelley et al. |
| 7,771,870 B2 | 8/2010 | Affinito et al. |
| 7,785,730 B2 | 8/2010 | Affinito et al. |
| 7,939,198 B2 | 5/2011 | Mukherjee et al. |
| 8,076,024 B2 | 12/2011 | Affinito et al. |
| 8,084,102 B2 | 12/2011 | Affinito |
| 8,087,309 B2 | 1/2012 | Kelley et al. |
| 8,105,717 B2 | 1/2012 | Skotheim et al. |
| 8,197,971 B2 | 6/2012 | Skotheim et al. |
| 8,264,205 B2 | 9/2012 | Kopera |
| 8,338,034 B2 | 12/2012 | Affinito et al. |
| 8,415,054 B2 | 4/2013 | Skotheim et al. |
| 8,603,680 B2 | 12/2013 | Affinito et al. |
| 8,617,748 B2 | 12/2013 | Mikhaylik et al. |
| 8,623,557 B2 | 1/2014 | Skotheim et al. |
| 8,728,661 B2 | 5/2014 | Skotheim et al. |
| 8,753,771 B2 | 6/2014 | Skotheim et al. |
| 8,871,387 B2 | 10/2014 | Wang et al. |
| 8,936,870 B2 | 1/2015 | Affinito et al. |
| 8,968,928 B2 | 3/2015 | Wang et al. |
| 9,005,311 B2 | 4/2015 | Safont et al. |
| 9,005,809 B2 | 4/2015 | Wilkening et al. |
| 9,034,421 B2 | 5/2015 | Mikhaylik et al. |
| 9,040,197 B2 | 5/2015 | Affinito et al. |
| 9,040,201 B2 | 5/2015 | Affinito et al. |
| 9,065,149 B2 | 6/2015 | Skotheim et al. |
| 9,077,041 B2 | 7/2015 | Burnside et al. |
| 9,105,938 B2 | 8/2015 | Scordilis-Kelley et al. |
| 9,214,678 B2 | 12/2015 | Mikhaylik |
| 9,397,342 B2 | 7/2016 | Skotheim et al. |
| 9,419,274 B2 | 8/2016 | Wilkening et al. |
| 9,490,478 B2 | 11/2016 | Mikhaylik et al. |
| 9,531,009 B2 | 12/2016 | Kumaresan et al. |
| 9,548,492 B2 | 1/2017 | Affinito et al. |
| 9,559,348 B2 | 1/2017 | Kumaresan et al. |
| 9,577,243 B2 | 2/2017 | Schmidt et al. |
| 9,577,267 B2 | 2/2017 | Scordilis-Kelley et al. |
| 9,653,735 B2 | 5/2017 | Skotheim et al. |
| 9,653,750 B2 | 5/2017 | Laramie et al. |
| 9,711,784 B2 | 7/2017 | Kelley et al. |
| 9,728,768 B2 | 8/2017 | Mikhaylik et al. |
| 9,735,411 B2 | 8/2017 | Viner et al. |
| 9,755,268 B2 | 9/2017 | Fleischmann et al. |
| 9,780,404 B2 | 10/2017 | Scordilis-Kelley et al. |
| 9,825,328 B2 | 11/2017 | Du et al. |
| 9,853,287 B2 | 12/2017 | Mikhaylik et al. |
| 9,947,963 B2 | 4/2018 | Du et al. |
| 2004/0175621 A1 | 9/2004 | Iriyama et al. |
| 2005/0196672 A1 | 9/2005 | Mukherjee et al. |
| 2006/0115579 A1 | 6/2006 | Mukherjee et al. |
| 2007/0020521 A1 | 1/2007 | Obrovac et al. |
| 2007/0221265 A1 | 9/2007 | Affinito et al. |
| 2007/0281206 A1* | 12/2007 | Fujikawa ............... H01M 2/145 429/62 |
| 2008/0318128 A1 | 12/2008 | Simoneau et al. |
| 2009/0035646 A1 | 2/2009 | Mikhaylik et al. |
| 2009/0055110 A1 | 2/2009 | Kelley et al. |
| 2010/0035128 A1 | 2/2010 | Scordilis-Kelley et al. |
| 2010/0129699 A1* | 5/2010 | Mikhaylik ........ H01M 10/0569 429/50 |
| 2010/0181527 A1* | 7/2010 | Nesvadba ............. H01M 4/608 252/182.1 |
| 2010/0239914 A1 | 9/2010 | Mikhaylik et al. |
| 2010/0319188 A1* | 12/2010 | Yamazaki ............... H01M 4/13 29/623.5 |
| 2011/0006738 A1 | 1/2011 | Mikhaylik et al. |
| 2011/0008233 A1* | 1/2011 | Miyanaga ........... H01M 4/5825 423/306 |
| 2011/0014524 A1 | 1/2011 | Skotheim et al. |
| 2011/0068001 A1 | 3/2011 | Affinito et al. |
| 2011/0070491 A1 | 3/2011 | Campbell et al. |
| 2011/0070494 A1 | 3/2011 | Campbell et al. |
| 2011/0076560 A1 | 3/2011 | Scordilis-Kelley et al. |
| 2011/0159376 A1 | 6/2011 | Skotheim et al. |
| 2011/0165471 A9 | 7/2011 | Skotheim et al. |
| 2011/0177398 A1 | 7/2011 | Affinito et al. |
| 2011/0206992 A1 | 8/2011 | Campbell et al. |
| 2011/0256450 A1 | 10/2011 | Campbell et al. |
| 2012/0034509 A1* | 2/2012 | Bae ..................... H01M 2/1646 429/145 |
| 2012/0048729 A1 | 3/2012 | Mikhaylik et al. |
| 2012/0052339 A1 | 3/2012 | Mikhaylik et al. |
| 2012/0052397 A1 | 3/2012 | Mikhaylik et al. |
| 2012/0070746 A1 | 3/2012 | Mikhaylik et al. |
| 2012/0082872 A1 | 4/2012 | Schmidt et al. |
| 2012/0082901 A1 | 4/2012 | Schmidt et al. |
| 2013/0164635 A1 | 6/2013 | Schmidt et al. |
| 2013/0316072 A1 | 11/2013 | Scordilis-Kelley et al. |
| 2014/0004400 A1* | 1/2014 | Ueki ..................... H01M 2/166 429/94 |
| 2014/0062411 A1 | 3/2014 | Mikhaylik et al. |
| 2014/0079994 A1 | 3/2014 | Affinito et al. |
| 2014/0127419 A1 | 5/2014 | Fleischmann et al. |
| 2014/0127577 A1 | 5/2014 | Fleischmann et al. |
| 2014/0272565 A1 | 9/2014 | Gronwald et al. |
| 2014/0272594 A1 | 9/2014 | Safont et al. |
| 2014/0272595 A1 | 9/2014 | Cristadoro et al. |
| 2014/0272597 A1 | 9/2014 | Mikhaylik et al. |
| 2015/0010804 A1 | 1/2015 | Laramie et al. |
| 2015/0044517 A1 | 2/2015 | Mikhaylik et al. |
| 2015/0086837 A1 | 3/2015 | Laramie et al. |
| 2015/0162586 A1 | 6/2015 | Fleischmann et al. |
| 2015/0180037 A1 | 6/2015 | Gronwald et al. |
| 2015/0180084 A1 | 6/2015 | Scordilis-Kelley et al. |
| 2015/0188194 A1 | 7/2015 | Mikhaylik et al. |
| 2015/0236320 A1 | 8/2015 | Laramie et al. |
| 2015/0236322 A1 | 8/2015 | Laramie et al. |
| 2015/0280277 A1 | 10/2015 | Fleischmann et al. |
| 2015/0287986 A1 | 10/2015 | Affinito et al. |
| 2015/0287998 A1 | 10/2015 | Scordilis-Kelley et al. |

(56) References Cited

U.S. PATENT DOCUMENTS

| | | |
|---|---|---|
| 2015/0318539 A1 | 11/2015 | Kelley et al. |
| 2015/0349310 A1 | 12/2015 | Viner et al. |
| 2016/0072132 A1 | 3/2016 | Liao et al. |
| 2016/0118638 A1 | 4/2016 | Gronwald et al. |
| 2016/0118651 A1 | 4/2016 | Kovalev et al. |
| 2016/0301080 A1 | 10/2016 | Skotheim et al. |
| 2016/0344067 A1 | 11/2016 | Laramie et al. |
| 2017/0018815 A1 | 1/2017 | Laramie et al. |
| 2017/0047590 A1 | 2/2017 | Mikhaylik et al. |
| 2017/0141385 A1 | 5/2017 | Scordilis-Kelley et al. |
| 2017/0141402 A1 | 5/2017 | Affinito et al. |
| 2017/0141442 A1 | 5/2017 | Mikhaylik et al. |
| 2017/0149086 A1 | 5/2017 | Du et al. |
| 2017/0200975 A1 | 7/2017 | Liao et al. |
| 2017/0250390 A1 | 8/2017 | Laramie et al. |
| 2017/0288208 A1 | 10/2017 | Kelley et al. |
| 2017/0338475 A1 | 11/2017 | Laramie et al. |
| 2017/0352863 A1 | 12/2017 | Mikhaylik et al. |
| 2017/0373321 A1 | 12/2017 | Skotheim et al. |
| 2018/0006303 A1 | 1/2018 | Mikhaylik et al. |
| 2018/0034100 A1 | 2/2018 | Du et al. |
| 2018/0048018 A1 | 2/2018 | Scordilis-Kelley et al. |
| 2018/0138542 A1 | 5/2018 | Bunte et al. |

FOREIGN PATENT DOCUMENTS

| | | |
|---|---|---|
| WO | WO 2007/111901 A2 | 10/2007 |
| WO | WO 2012/025542 A1 | 3/2012 |

OTHER PUBLICATIONS

Brunauer et al., Adsorption of Gases in Multimolecular Layers. J. Am. Chem. Soc. 1938;60:309-19.

Dominey, Lithium Batteries, New Materials, Developments and Perspectives, Chapter 4. Elsevier, Amsterdam. 1994; 137-165.

* cited by examiner

ELECTROCHEMICAL CELLS COMPRISING SHORT-CIRCUIT RESISTANT ELECTRONICALLY INSULATING REGIONS

RELATED APPLICATIONS

This application claims priority under 35 U.S.C. § 119(e) to U.S. Provisional Application No. 62/469,184, filed Mar. 9, 2017, and entitled "Electrochemical Cells Comprising Short-Circuit Resistant Electronically Insulating Regions," which is incorporated herein by reference in its entirety for all purposes.

TECHNICAL FIELD

Electrochemical cells and associated methods are generally described.

BACKGROUND

Lithium metal and alloys containing lithium metal are desirable materials for use as an anode in rechargeable batteries due to the high theoretical capacity of lithium. However, safety concerns still exist for certain lithium metal batteries due to the possibility for dendrite growth on the lithium surface during electrochemical cycling. Dendrite growth may also be a concern for conventional Li-ion batteries which employ graphite anodes.

Accordingly, improved compositions and methods for suppressing lithium dendrite growth during the operation of electrochemical cells are desirable.

SUMMARY

The present disclosure is related to electrochemical cells and associated methods. According to certain embodiments, the electrochemical cells comprise an electronically insulating region. In some embodiments, the electronically insulating region can be mechanically compliant. In some embodiments, the insulating region may comprise multiple layers (e.g., mechanically separable layers). The use of such arrangements can, according to certain embodiments, reduce the degree to which the electronically insulating region is breached by lithium dendrite growth. The subject matter of the present invention involves, in some cases, interrelated products, alternative solutions to a particular problem, and/or a plurality of different uses of one or more systems and/or articles.

In one aspect, an electrochemical cell is described. The electrochemical cell may comprise a first electrode comprising lithium as an electrode active material, a second electrode, a liquid-containing electrolyte, and an electronically insulating region between the first electrode and the second electrode. In some embodiments, the electronically insulating region is mechanically separable from the first and second electrodes. The electronically insulating region may comprise a first electronically insulating layer and a second electronically insulating layer. A mechanically separable interface may be located between the first electronically insulating layer and the second electronically insulating layer. In some cases, at least 5% of the volume of the first electronically insulating layer is occupied by the electrolyte and 5% of the volume of the second electronically insulating layer is occupied by the electrolyte.

In some embodiments, the electrochemical cell may comprise a first electrode comprising lithium as an electrode active material, a second electrode, and an electronically insulating region between the first electrode and the second electrode. In some embodiments, the electronically insulating region is mechanically separable from the first and second electrodes. The electronically insulating region may comprise a first electronically insulating layer and a second electronically insulating layer, and a mechanically separable interface may be located between the first electronically insulating layer and the second electronically insulating layer. In some cases, the ionic conductivity of the second electronically insulating layer is within 10% of the ionic conductivity of the first electronically insulating layer.

In some embodiments, the electrochemical cell may comprise a first electrode comprising lithium as an electrode active material, a second electrode, and an electronically insulating region between the first electrode and the second electrode. In some embodiments, the electronically insulating region is mechanically separable from the first and second electrodes, and may have an electronic conductivity of less than 1e-7 S/cm (1e S/cm). The electronically insulating region may comprise a first electronically insulating layer, a second electronically insulating layer, and an intermediate layer positioned between the first electronically insulating layer and the second electronically insulating layer. The intermediate layer may have a yield strength smaller than the yield strength of lithium metal.

In some embodiments, the electrochemical cell may comprise a first electrode comprising lithium as an electrode active material, a second electrode, and an electronically insulating region between the first electrode and the second electrode. In some embodiments, the electronically insulating region is mechanically separable from the first and second electrodes. The electronically insulating region may comprise a first electronically insulating layer and a second electronically insulating layer, and an intermediate layer positioned between the first electronically insulating layer and the second electronically insulating layer. The intermediate layer may have a yield strength that is smaller than the yield strength of the first electronically insulating layer, and smaller than the yield strength of the second electronically insulating layer.

In some embodiments, the electrochemical cell may comprise a first electrode comprising lithium as an electrode active material, a second electrode, and an electronically insulating region between the first electrode and the second electrode. The electronically insulating region may comprise internal passageways that extend laterally across at least a portion of the electronically insulating region. In some embodiments, at least a portion of the internal passageways have lengths of at least 5 nm.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
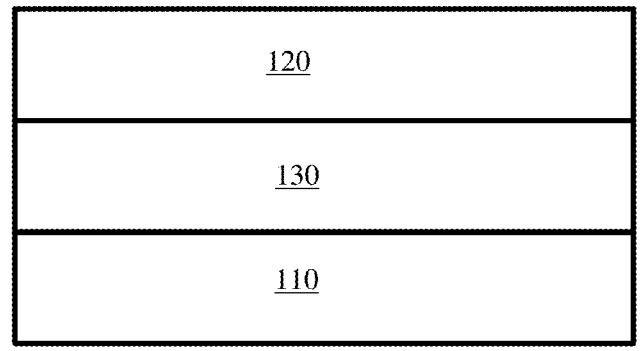
FIG. 1A shows, in accordance with some embodiments, a cross-sectional schematic illustration of an electrochemical cell comprising a first electrode, a second electrode, and an electronically insulating region.

Inventive arrangements of electronically insulating regions in electrochemical cells, and associated methods, are generally described. According to some embodiments, certain of the articles and/or methods described herein can be used to inhibit the degree to which lithium redeposition in lithium-containing electrochemical cells causes mechanical breach of the electronically insulating region. Such breach can be undesirable because it can lead to direct electronic contact (and, in some cases, direct contact) between the anode and the cathode, which can lead to short-circuiting.

In certain exemplary electrochemical cells, the anode comprises lithium metal, a lithium alloy, or lithium ions that are removed during discharge and regenerated during charge. As has been generally recognized, lithium redeposition may occur unevenly during cycling of such cells. Uneven redeposition may result in the formation of rough electrode (e.g., anode) surfaces and/or the formation of lithium dendrites. Surface protrusions and/or dendrites containing lithium may grow through the cell to the extent that they breach the separator. In some cases, it may be possible for either of these species to grow through the separator and the rest of the cell such that contact is made between the anode and the cathode. When this occurs, it generally causes a short circuit in the cell that both prevents further operation and may be dangerous due to thermal runaway. The inventors have recognized these problems, and have developed inventive articles and methods that can be used to inhibit and/or prevent dendrite growth through the electronically insulating region within electrochemical cells. For example, according to certain embodiments, the inventors have found that by using electrochemical cell regions able to accommodate redeposited lithium in certain ways, the redeposition can be redirected or otherwise controlled such that the separator is not fully breached, thus avoiding short-circuits and enhancing battery performance.

As described above, certain embodiments are related to electrochemical cells. Electrochemical cells typically comprise a first electrode (e.g., an anode) and a second electrode (e.g., a cathode). The first electrode may comprise lithium as an electrode active material (e.g., in the case of batteries containing lithium metal and/or a lithium alloy as an anode active species, or in the case where lithium intercalation compounds are employed as an electrode active material). In some embodiments, the first electrode may comprise a species capable of intercalating and deintercalating lithium ions (e.g., in the case of certain lithium ion batteries). The second electrode may comprise any suitable cathode for lithium metal or lithium ion batteries. Further description of acceptable first and second electrode materials are provided below.

As used herein, electrode active materials are those materials associated with an electrode and which participate in the electrochemical reaction(s) of the electrochemical cell that generate electrical current. Cathode active materials are electrode active materials associated with the cathode of the electrochemical cell, and anode active materials are electrode active materials associated with the anode of the electrochemical cell. "Cathode" refers to the electrode in which an electrode active material is oxidized during charging and reduced during discharging, and "anode" refers to the electrode in which an electrode active material is reduced during charging and oxidized during discharging.

In some embodiments, the electrochemical cell may further comprise a liquid-containing electrolyte. That is, the electrochemical cell comprises an electrolyte with a liquid component (e.g., a solvent). In some embodiments, the liquid-containing electrolyte comprises solutes, suspended solids, or other species that would be solids absent the present of other liquid electrolyte components. A liquid-containing electrolyte and/or liquid component may also infiltrate other cell components (such as pores in a separator), and/or may dissolve in other cell components. In some embodiments, the liquid-containing electrolyte and/or liquid component may be present in one or more cell components in a manner such that it forms at least one component of a gel. In certain embodiments, the liquid-containing electrolyte and/or liquid component may be present in one or more cell components in a manner such that it does not form at least one component of a gel. Suitable liquid-containing electrolyte compositions and other electrolyte compositions will be described in more detail below. It should also be noted that the electrochemical cell may comprise an electrolyte that does not contain a liquid, such as a solid polymer electrolyte.

In some embodiments, the electrochemical cell may further comprise an electronically insulating region between the first electrode and the second electrode. The electronically insulating region may have an electronic conductivity low enough that transport of electrons through its bulk is strongly hindered. This forces the majority (or all) of the electrons to be transferred between the cathode and the anode via an external load (when discharging) or via the charging mechanism (when charging). In certain embodiments, the electronically insulating region may have an electronic conductivity of less than or equal to $10^{-7}$ S/cm. The electronic conductivity of an electronically insulating region is measured by electrochemical impedance spectroscopy (EIS), and is measured in a direction corresponding to the direction through which ions are transported through the electronically insulating region during operation of the electrochemical cell. Generally, electrochemical impedance spectroscopy conductivity measurements are made by assembling a cell in which the component that is being measured (such as, e.g., the electronically insulating region) is positioned between two electronically conductive substrates. The complex impedance across the cell component (which has known dimensions) is determined by passing a 5 mV alternating current across the electronically conductive substrates at a 0 V bias and measuring the real and imaginary impedance between the electronically conductive substrates as a function of frequency between 100 kHz and 20 mHz. Components which have both electrical and ionic conductivity will typically display a low frequency relaxation arising from electronic conductivity and a high frequency relaxation arising from both electronic and ionic conductivity. The low frequency relaxation may be used to determine the electrical resistance of the cell component, from which the electrical conductivity can be calculated based on the geometry of the cell component. The high frequency relaxation may then be used to determine the ionic conductivity of the cell component by assuming that the ionic resistance of the component and the electronic resistance of the component act in parallel and then calculating the ionic resistance that would give rise to the measured high frequency relaxation. The ionic conductivity may then be determined based on geometry of the cell component. In this context, the geometry across which the electronic conductivity is measured is calculated using the geometric surfaces of the cell component. The geometric surfaces of a cell component would be understood by those of ordinary skill in the art as referring to the surfaces defining the outer boundaries of the cell component, for example, the area that may be measured by a macroscopic measuring tool (e.g., a ruler), and do not include the internal surface area (e.g., area within pores of a porous material such as a porous membrane separator, etc.).

A non-limiting example of an electrochemical cell comprising a first electrode, a second electrode, and an electronically insulating region is shown in FIG. 1A. In this figure, electrochemical cell 100 comprises first electrode 110, second electrode 120, and electronically insulating region 130. It should be noted that while FIG. 1A shows the electronically insulating region in direct contact with both the first electrode and the second electrode, other arrangements of the electronically insulating region with respect to the first and the second electrode are also possible. For example, one or more intervening cell components (such as, e.g., a liquid-containing electrolyte) may be present between the first electrode and the electronically insulating region, or between the electronically insulating region and the second electrode.

As used herein, a cell component that is positioned "between" two cell components may be directly between the two cell components such that no intervening cell component is present, or an intervening cell component may be present.

Similarly, while FIG. 1A does not depict an electrolyte, it should also be understood that some embodiments comprise an electrolyte, such as a liquid-containing electrolyte. In such embodiments, a liquid-containing electrolyte may be present in the electronically insulating region, present in a region of the electrochemical cell in between the first electrode and the electronically insulating region (if such a region exists), and/or present in a region of the electrochemical cell in between the second electrode and the electronically insulating region (if such a region exists).

Figure 1B:
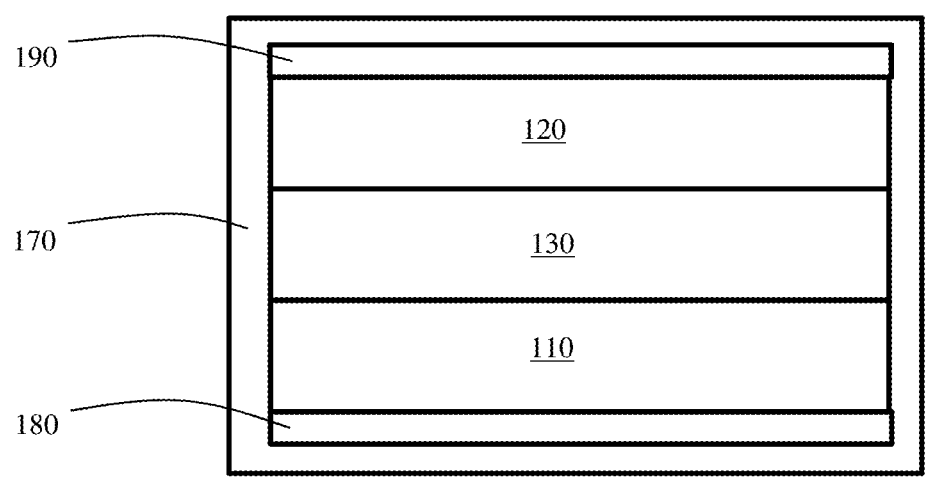
FIG. 1B shows, in accordance with some embodiments, a cross-sectional schematic illustration of an electrochemical cell comprising optional current collectors and an optional containment structure.

In some cases, an electrochemical cell also may comprise one or more additional optional components, such a containment structure and/or one or more current collectors, some of which are shown in FIG. 1B. FIG. 1B shows an electrochemical cell comprising optional containment structure 170, optional first electrode current collector 180, and optional second electrode current collector 190. While the first and second electrodes in FIG. 1A and FIG. 1B are shown as having a planar configuration, other embodiments may include non-planar configurations. Additionally, non-planar arrangements, arrangements with proportions of materials different than those shown, and other alternative arrangements are useful in connection with certain embodiments. A typical electrochemical cell also could include, of course, external circuitry, housing structure, and the like. Those of ordinary skill in the art are well aware of the many arrangements that can be utilized with the general schematic arrangement as shown in the figures and described herein. According to certain embodiments, the first and second electrodes can be configured such that no intervening electrodes or portions of electrodes are positioned between the first electrode and the second electrode.

Figure 2A:
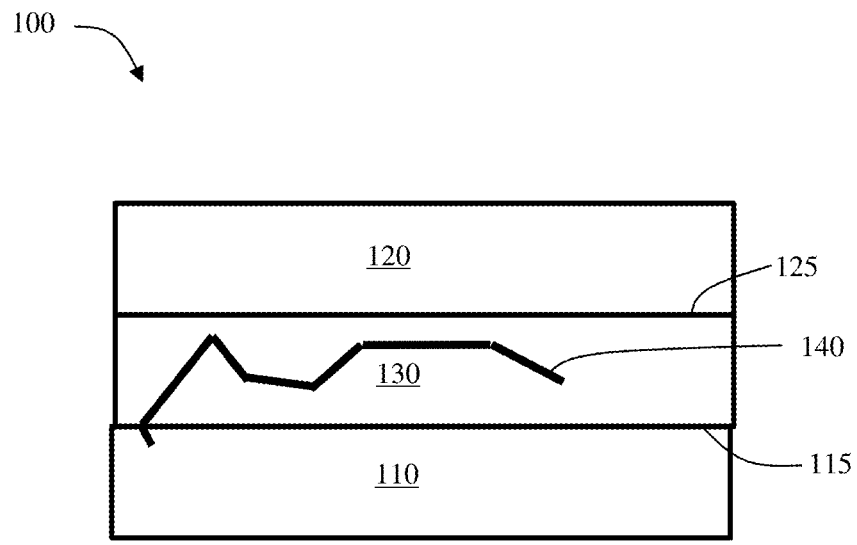
FIG. 2A shows, in accordance with some embodiments, a cross-sectional schematic illustration of an electrochemical cell comprising a dendrite that does not traverse the full thickness of an electronically insulating region.
Figure 2B:
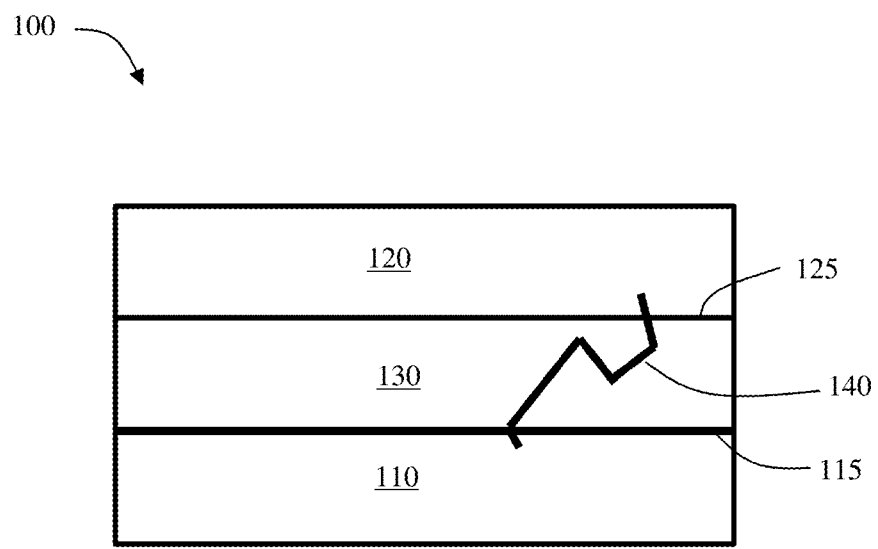
FIG. 2B shows, in accordance with some embodiments, a cross-sectional schematic illustration of an electrochemical cell comprising a dendrite that traverses the full thickness of an electronically insulating region.

In some embodiments, the electronically insulating region may have certain properties that render it suitable for trapping lithium dendrites. In some embodiments, the electronically insulating region may be configured such that it is more energetically favorable for lithium dendrites to grow within the electronically insulating region (without traversing the full thickness of the electronically insulating region) than it is for lithium dendrites to traverse the full thickness of the electronically insulating region. That is, the lithium dendrites may enter the electronically insulating region by passing through a first interface between the first electrode and the electronically insulating region (or between an intervening cell component disposed between the first electrode and the electronically insulating region) but may not exit the electronically insulating region by passing through a second interface between the electronically insulating region and the second electrode (or between the electronically insulating region and an intervening cell component disposed between the electronically insulating region and the second electrode). FIG. 2A shows one example of a growth trajectory for a lithium dendrite within the electronically insulating region. In the exemplary embodiment shown in FIG. 2A, lithium dendrite 140 passes through first interface 115 to enter electronically insulating region 130 but does not pass through second interface 125 to exit electronically insulating region 130. FIG. 2B shows an example of a growth trajectory for a lithium dendrite that instead traverses the full thickness of the electronically insulating region, which is generally undesirable as it generally causes the electrochemical cell to short circuit. In this case, lithium dendrite 140 passes through first interface 115 to enter electronically insulating region 130 and through second interface 125 to exit electronically insulating region 130. Because, in FIG. 2B, dendrite 140 passes from one side of electronically insulating region 130 (e.g., facing first electrode 110) to the opposite side of electronically insulating region 130 (e.g., facing second electrode 120), dendrite 140 can create a short circuit within electrochemical cell 100.

In some embodiments, the electronically insulating region may be mechanically separable from at least one of the first electrode and the second electrode. In some embodiments, the electronically insulating region may be mechanically separable from both the first electrode and the second electrode. Two electrochemical cell components that are said to be mechanically separable (such as, e.g., an electronically insulating region and an electrode) when the electrochemical cell components are capable of being separated from each other along at least a portion of an interface therebetween (such as, e.g., an interface between the two components when they are in direct contact with each other, an interface between one of the components and an intervening cell component, an interface between two intervening cell components therebetween). In some embodiments, two electrochemical cell components that are mechanically separable are capable of being separated from each other along at least a portion of an interface therebetween via the application of a force with a magnitude of less than 5 N/mm, less than 2 N/mm, less than 1 N/mm, or less than 0.1 N/mm. In some embodiments, two components that are mechanically separable (such as, e.g., an electronically insulating region and an electrode) are capable of being separated along at least 50%, at least 75%, at least 90%, at least 95%, or at least 99% of an interface therebetween (e.g., via the application of a force with a magnitude of less than 5 N/mm, less than 2 N/mm, less than 1 N/mm, or less than 0.1 N/mm). In some embodiments, two components that are mechanically separable are capable of being separated along less than or equal to 100%, less than 99%, less than 95%, less than 90%, or less than 75% of an interface therebetween (e.g., via the application of a force with a magnitude of less than 5 N/mm, less than 2 N/mm, less than 1 N/mm, or less than 0.1 N/mm). Combinations of the above-referenced ranges are also possible (e.g., capable of being separated along at least 50% and less than or equal to 100% of the interface). Other ranges are also possible. In some embodiments, two electrochemical cell components that are mechanically separable are capable of being completely separated from each other via the application of a force with a magnitude of less than 5 N/mm, less than 2 N/mm, less than 1 N/mm, or less than 0.1 N/mm.

The force necessary to separate the components (e.g., for determining the mechanical separability of two components) can be measured by employing a peel strength test, which is carried out by adhering each component to a test grip and then translating each test grip in a direction perpendicular to the components at a speed of 254 mm per minute until the test grips have translated 127 mm while ensuring that the test grips do not delaminate from the components. The measured load on the test grips can then be plotted as a function of distance moved. Such plots typically display an initial peak followed by a relatively constant value of force. The average force measured after the initial peak can then be divided by the length of the components perpendicular to the opening crack to determine the force required to mechanically separate the components per unit length. Peel strength tests are carried out on samples which are 25 mm wide and at least 25 mm long using grips with dimensions parallel to the components of 25 mm by 25 mm if samples may be fabricated from the components of interest. If such samples cannot be fabricated, smaller sample widths and grips may be used. The grip should have a width perpendicular to the direction of the crack that is equivalent to the width of the sample.

In certain embodiments, the strength of adhesion between the electronically insulating region and the first electrode as measured by the peel test may be relatively small. In some embodiments, the strength of adhesion between the electronically insulating region and the first electrode may be less than or equal to 5 N/mm, less than or equal to 2 N/mm, less than or equal to 1 N/mm, less than or equal to 0.5 N/mm, less than or equal to 0.1 N/mm, less than or equal to 0.05 N/mm, or less than or equal to 0.01 N/mm. In some embodiments, the strength of adhesion between the electronically insulating region and the first electrode may be greater than or equal to 0.001 N/mm, greater than or equal to 0.01 N/mm, or greater than or equal to 0.1 N/mm. Combinations of the above-referenced ranges are also possible (e.g., greater than or equal to 0.02 N/mm and less than or equal to 0.5 N/mm). Other ranges are also possible.

In certain embodiments, the strength of adhesion between the electronically insulating region and the second electrode may be relatively small. In some embodiments, the strength of adhesion between the electronically insulating region and the second electrode may be less than or equal to 5 N/mm, less than or equal to 2 N/mm, less than or equal to 1 N/mm, less than or equal to 0.5 N/mm, less than or equal to 0.1 N/mm, less than or equal to 0.05 N/mm, or less than or equal to 0.01 N/mm. In some embodiments, the strength of adhesion between the electronically insulating region and the second electrode may be greater than or equal to 0.001 N/mm, greater than or equal to 0.01 N/mm, or greater than or equal to 0.1 N/mm. Combinations of the above-referenced ranges are also possible (e.g., greater than or equal to 0.02 N/mm and less than or equal to 0.5 N/mm). Other ranges are also possible.

Figure 3:
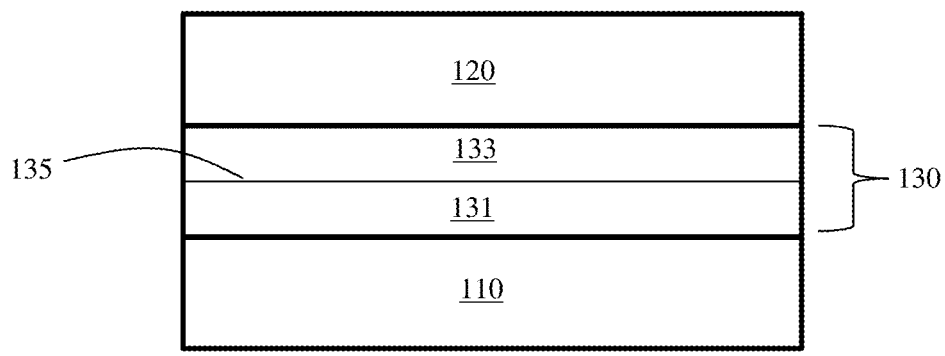
FIG. 3 shows, in accordance with some embodiments, a cross-section of an electrochemical cell which comprises an electronically insulating region comprising a first electronically insulating layer and a second electronically insulating layer.
Figure 4:
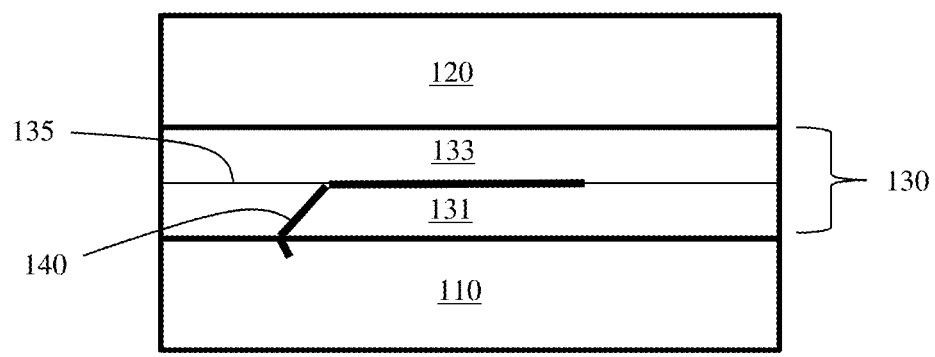
FIG. 4 shows, in accordance with some embodiments, a cross-sectional schematic illustration in which a dendrite grows along the interface between a first electronically insulating layer and a second electronically insulating layer.

In certain embodiments, the electronically insulating region may comprise at least two layers that are mechanically separable along at least a portion of the interface between them. In other words, in certain embodiments, a mechanically separable interface is located between the first electronically insulating layer and the second electronically insulating layer. FIG. 3 shows one example of such a configuration, where electronically insulating region 130 comprises first electronically insulating layer 131 adjacent to second electronically insulating layer 133 along mechanically separable interface 135. It should be noted that while FIG. 3 shows two mechanically separable layers, it is also possible for the electronically insulating region to comprise three, four, or more mechanically separable layers. Without wishing to be bound by theory, it is believed that mechanically separable interfaces may be suitable for trapping lithium dendrites because they may allow for and/or promote lithium dendrite growth along the interface. One example of lithium growth along a mechanically separable interface is shown schematically in FIG. 4, where lithium dendrite 140 grows along mechanically separable interface 135 between first electronically insulating layer 131 and second electronically insulating layer 133. In the exemplary embodiment shown in FIG. 4, the lithium dendrite does not grow into second electronically insulating layer 133, and does not traverse the thickness of electronically insulating region 130. Instead, the growth of the redeposited lithium is directed laterally within the electronically insulating region at the mechanically separable interface therein. In this way growth of the redeposited lithium could be said to be trapped within the electronically insulating region.

While first electronically insulating layer 131 and second electronically insulating layer 133 have been illustrated as single-layer materials (e.g., made up of a single type or composite mixture of materials) in the figure, in other cases, the first electronically insulating layer and/or the second electronically insulating layer can be a multi-layered structure. For example, in some embodiments, the first electronically insulating layer is itself a multi-layer structure comprising a plurality of layers. In certain embodiments, the second electronically insulating layer is itself a multi-layer structure comprising a plurality of layers. In some embodiments, the first electronically insulating layer is a multi-layered structure and the second electronically insulating layer is a multi-layered structure.

In certain embodiments, the electronically insulating region may comprise two layers separated by a mechanically separable interface, and the strength of adhesion between the two layers across the mechanically separable interface may be relatively small. In some embodiments, the strength of adhesion between the two layers on each side of a mechanically separable interface may be less than or equal to 5 N/mm, less than or equal to 2 N/mm, less than or equal to 1 N/mm, less than or equal to 0.5 N/mm, less than or equal to 0.1 N/mm, less than or equal to 0.05 N/mm, or less than or equal to 0.01 N/mm, less than or equal to 0.005 N/mm, or less than or equal to 0.002 N/mm. In some embodiments, the strength of adhesion between the two layers on each side of a mechanically separable interface may be greater than or equal to 0.001 N/mm, greater than or equal to 0.01 N/mm, or greater than or equal to 0.1 N/mm. Combinations of the above-referenced ranges are also possible (e.g., greater than or equal to 0.02 N/mm and less than or equal to 0.5 N/mm). Other ranges are also possible.

In some embodiments, the electronically insulating region comprises at least a first electronically insulating layer and a second electronically insulating layer, and at least 5%, at least 10%, or at least 25% of the area of the first electronically insulating layer at the interface between the first electronically insulating layer and the second electronically insulating area is not mechanically separable from the second electronically insulating layer. In some embodiments, the strength of adhesion between at least 5%, at least 10% or at least 25% of the area of the first electronically insulating layer at the interface between the first electronically insulating layer and the second electronically insulating area and the second electronically insulating layer may be greater than or equal to 5 N/mm. For example, the strength of adhesion between at least 5%, at least 10%, or at least 25% of the area of the first electronically insulating layer at the interface between the first electronically insulating layer and the second electronically insulating layer and the second electronically insulating layer may be greater than or equal to 10 N/mm, greater than or equal to 50 N/mm, or greater than or equal to 100 N/mm.

Figure 5:
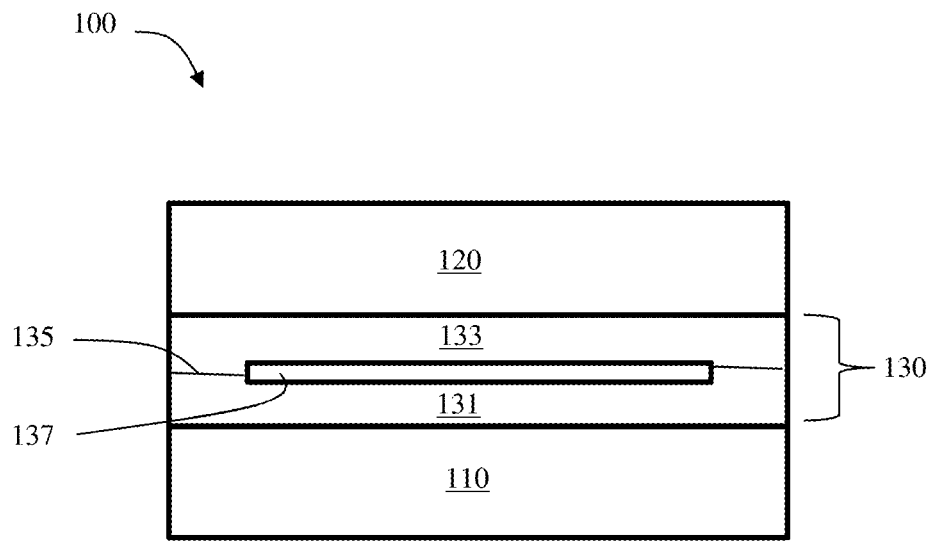
FIG. 5 shows, in accordance with some embodiments, a cross-sectional schematic illustration of an electrochemical cell comprising a first electronically insulating layer partially separated from a second electronically insulating layer by an interface and partially separated from the second electronically insulating layer by an intervening cell component.

In some embodiments, the electronically insulating region may comprise at least two layers and the first electronically insulating layer and the second electronically insulating layer may be in direct contact. In some embodiments, the electronically insulating region may comprise at least two layers and the first electronically insulating layer and the second electronically insulating layer may be separated by at least one intervening layer or cell component. That is, in embodiments in which the electronically insulating region comprises at least a first electronically insulating layer and a second electronically insulating layer, there may be no intervening cell component between the first electronically insulating layer and the second electronically insulating layer or there may be at least one intervening cell component between the first electronically insulating layer and the second electronically insulating layer. In some embodiments, the intervening cell component may comprise a liquid-containing electrolyte and/or a lithium dendrite. In some embodiments, the first electronically insulating layer may be partially separated from the second electronically insulating layer by an interface therebetween and partially separated from the second electronically insulating layer by an intervening cell component. A non-limiting example of one such arrangement is shown in FIG. 5, where first electronically insulating layer 131 is partially separated from second electronically insulating layer 133 by interface 135, and partially separated from second electronically insulating layer 133 by intervening cell component 137. In certain embodiments, the ratio of the intervening cell component between the first electronically insulating layer and the second electronically insulating layer to the interface between the first electronically insulating layer and the second electronically insulating layer may be greater than or equal to 0.05, greater than or equal to 0.1, greater than or equal to 0.2, greater than or equal to 0.5, greater than or equal to 1, greater than or equal to 2, greater than or equal to 5, or greater than or equal to 10. In certain embodiments, the ratio of the intervening cell component between the first electronically insulating layer and the second electronically insulating layer to the interface between the first electronically insulating layer and the second electronically insulating layer may be less than or equal to 20, less than or equal to 10, less than or equal to 5, less than or equal to 2, less than or equal to 1, less than or equal to 0.5, less than or equal to 0.2, or less than or equal to 0.1. Combinations of the above-referenced ranges are also possible (e.g., greater than or equal to 0.05 and less than or equal to 20, or greater than or equal to 0.1 and less than or equal to 2). Other ranges are also possible. In certain embodiments, the ratio of the intervening cell component between the first electronically insulating layer and the second electronically insulating layer to the interface between the first electronically insulating layer and the second electronically insulating layer may be approximately 1 (e.g., within 5%, 10%, or 25% of 1).

Similarly, in embodiments in which the electronically insulating region comprises at least a third electronically insulating layer, the third electronically insulating layer may be in direct contact with the second electronically insulating layer, separated from the second electronically insulating layer by at least one intervening cell component, or partially separated from the second electronically insulating layer by an interface therebetween and partially separated from the second electronically insulating layer by an intervening cell component. The above relationships between layers should also be understood to encompass contact between a fourth electronically insulating layer and a third electronically insulating layer, a fifth electronically insulating layer and a fourth electronically insulating layer, etc.

In certain embodiments, the electronically insulating region comprises at least a first electronically insulating layer, a second electronically insulating layer, and a liquid-containing electrolyte, and both the first electronically insulating layer and the second electronically insulating layer may be permeated by a liquid component of the electrolyte.

Permeation of the liquid component of the electrolyte through a layer may allow for ionic conduction through the layer and/or the transport of lithium ions through the layer. In some embodiments, a liquid component of the electrolyte is present throughout at least 50% of the externally-accessible void volume of the first electronically insulating layer, at least 75% of the externally-accessible void volume of the first electronically insulating layer, at least 90% of the externally-accessible void volume of the first electronically insulating layer, at least 95% of the externally-accessible void volume of the first electronically insulating layer, or at least 99% of the externally-accessible void volume of the first electronically insulating layer. The percentage of the externally-accessible void volume of a layer (e.g., a first electronically insulating layer, a second electronically insulating layer) occupied by a liquid component of the electrolyte may be determined by measuring both the externally accessible void volume of the layer (e.g., as described in further detail below) and the amount of liquid electrolyte present in the layer (by, e.g., weighing the layer prior to and after removal of the liquid electrolyte, calculating the mass of the liquid electrolyte present in the layer prior to its removal using this information, and using the density of the liquid electrolyte to calculate the volume of the liquid electrolyte prior to its removal). The externally-accessible void volume of the layer may be determined by removing all electrolyte from the layer and then employing ASTM standard D4284-07, as described in further detail below. The electrolyte may be removed from the layer by, e.g., rinsing the layer three times (in, e.g., dimethyl carbonate for non-aqueous electrolytes or water for aqueous electrolytes) and then applying reduced pressure and/or heat.

In certain embodiments, the electronically insulating region comprises at least a second electronically insulating layer and a liquid-containing electrolyte, and the liquid component of the electrolyte is present throughout at least 75% of the externally-accessible void volume of the second electronically insulating layer, at least 90% of the externally-accessible void volume of the second electronically insulating layer, at least 95% of the externally-accessible void volume of the second electronically insulating layer, or at least 99% of the externally-accessible void volume of the second electronically insulating layer.

In certain embodiments, the electronically insulating region comprises at least a first electronically insulating layer, a second electronically insulating layer and a liquid-containing electrolyte, and the liquid component of the electrolyte is present throughout at least 75% of the externally-accessible void volume of the first electronically insulating layer and 75% of the externally-accessible void volume of the second electronically insulating layer, at least 90% of the externally-accessible void volume of the first electronically insulating layer and 90% of the externally-accessible void volume of the second electronically insulating layer, at least 95% of the externally-accessible void volume of the first electronically insulating layer and 95% of the externally-accessible void volume of the second electronically insulating layer, or at least 99% of the externally-accessible void volume of the first electronically insulating layer and 99% of the externally-accessible void volume of the second electronically insulating layer.

In certain embodiments, the electronically insulating region comprises at least a first electronically insulating layer and a liquid-containing electrolyte, and at least 5% of the volume of the first electronically insulating layer is occupied by the liquid component of the electrolyte, at least 10% of the volume of the first electronically insulating layer is occupied by the liquid component of the electrolyte, or at least 25% of the volume of the first electronically insulating layer is occupied by the liquid component of the electrolyte. In some embodiments, less than 50% of the volume of the first electronically insulating layer is occupied by the liquid component of the electrolyte, less than 25% of the volume of the first electronically insulating layer is occupied by the liquid component of the electrolyte, or less than 10% of the volume of the first electronically insulating layer is occupied by the liquid component of the electrolyte. Combinations of the above-referenced ranges are also possible (e.g., at least 5% and less than 50% of the volume of the first electronically insulating layer is occupied by the liquid component of the electrolyte). Other ranges are also possible. The percentage of a region or layer (e.g., an electronically insulating region, an electronically insulating layer) occupied by the liquid component of the electrolyte may be determined by measuring the volume enclosed by the outer boundary of the region or layer (e.g., by use of a ruler) and the amount of liquid electrolyte present in the layer (by, e.g., weighing the layer prior to and after removal of the liquid electrolyte, calculating the mass of the liquid electrolyte present in the layer prior to its removal using this information, and using the density of the liquid electrolyte to calculate the volume of the liquid electrolyte prior to its removal).

In certain embodiments, the electronically insulating region comprises at least a second electronically insulating layer and a liquid-containing electrolyte, and at least 5% of the volume of the second electronically insulating layer is occupied by a liquid component of the electrolyte, at least 10% of the volume of the second electronically insulating layer is occupied by the liquid component of the electrolyte, or at least 25% of the volume of the second electronically insulating layer is occupied by the liquid component of the electrolyte. In some embodiments, less than 50% of the volume of the second electronically insulating layer is occupied by the liquid component of the electrolyte, less than 25% of the volume of the second electronically insulating layer is occupied by the liquid component of the electrolyte, or less than 10% of the volume of the second electronically insulating layer is occupied by the liquid component of the electrolyte. Combinations of the above-referenced ranges are also possible (e.g., at least 5% and less than 50% of the volume of the second electronically insulating layer is occupied by the liquid component of the electrolyte). Other ranges are also possible.

In certain embodiments, the electronically insulating region comprises at least a first electronically insulating layer, a second electronically insulating layer, and a liquid-containing electrolyte, and at least 5% of the volume of the first electronically insulating layer is occupied by a liquid component of the electrolyte and at least 5% of the volume of the second electronically insulating layer is occupied by the liquid component of the electrolyte, at least 10% of the volume of both the first electronically insulating layer and the second electronically insulating layer is occupied by the liquid component of the electrolyte, or at least 25% of the volume of both the first electronically insulating layer and the second electronically insulating layer is occupied by the liquid component of the electrolyte. In some embodiments, less than 50% of the volume of both the first electronically insulating layer and the second electronically insulating layer is occupied by the liquid component of the electrolyte, less than 25% of the volume of both the first electronically insulating layer and the second electronically insulating layer is occupied by the liquid component of the electrolyte, or less than 10% of the volume of both the first electronically insulating layer and the second electronically insulating layer is occupied by the liquid component of the electrolyte. Combinations of the above-referenced ranges are also possible (e.g., at least 5% and less than 50% of the volume of both the first electronically insulating layer and the second electronically insulating layer is occupied by the liquid component of the electrolyte). Other ranges are also possible.

According to some embodiments, the electronically insulating region comprises at least a first electronically insulating layer and a second electronically insulating layer and the first electronically insulating layer and the second electronically insulating layer may have relatively similar levels of ionic conductivity. In certain embodiments, the ionic conductivity of the second electronically insulating layer is within 10% of the ionic conductivity of the first electronically insulating layer. The ionic conductivity of the first electronically insulating layer and the second electronically insulating layer may be measured by impedance spectroscopy (EIS). Further details regarding the ionic conductivity of the first electronically insulating layer and the second electronically insulating layer will be provided below.

According to some embodiments, the electronically insulating region may comprise at least a first electronically insulating layer, a second electronically insulating layer, and an intermediate layer positioned between the first electronically insulating layer and the second electronically insulating layer. In some embodiments, the intermediate layer can be electronically insulating (e.g., having any of the insulating properties described elsewhere herein with respect to the first electronically insulating layer and/or the second electronically insulating layer). According to some embodiments, the intermediate layer may have a yield strength smaller than the yield strength of lithium metal (e.g., a yield strength smaller than 0.8 MPa). Without wishing to be bound by theory, it is believed that a layer with yield strength smaller than the yield strength of lithium metal may promote lithium dendrite growth within and/or in contact with the layer because a growing lithium dendrite may be capable of applying sufficient force to deform the layer plastically and/or elastically. This layer may also present a path for lithium dendrites to grow along that requires less mechanical energy to be expended than would be expended for growth along alternative paths (such as, e.g., paths that enter the second electronically insulating layer, paths that enter the second electronically insulating layer and traverse the full thickness of the second electronically insulating layer, etc.). A layer with a yield strength smaller than the yield strength of lithium metal may thus be considered to be capable of confining the growth of lithium dendrites against and/or within the layer. In this way, the layer with the yield strength smaller than lithium metal may be said to trap lithium dendrite(s).

The yield strength of a layer may be determined by using a Nanovea Mechanical Tester to perform an indentation test. The indentation test may be carried out by performing, in five separate locations, the following steps: contacting a cylindrical flat diamond tip indenter with a 200 micron diameter to the sample surface, pressing the indenter into the sample surface in a smooth and controlled manner until yield is observed, and then withdrawing the indenter from the sample in a smooth and controlled manner at the same rate. The rate of indentation is selected so that yield occurs after approximately 30 seconds to one minute of indenter motion. The force applied to the indenter is measured during each of these steps and corrected for zero point force and machine compliance. The sample evaluated using the indentation test should have a polished surface and a thickness of at least 10 times the indentation depth and at least six times the indentation radius $$\left(\text{i.e. } 6 \text{ times} \sqrt{\frac{A_P}{\pi}}\right).$$

In some embodiments, in which the electronically insulating layer comprises an intermediate layer, the intermediate layer may have a yield strength that is smaller than the yield strength of the first electronically insulating layer and/or smaller than the yield strength of the second electronically insulating layer. The yield strength of the intermediate layer may be smaller than the yield strength of the first electronically insulating layer but larger than the yield strength of the second electronically insulating layer, larger than the yield strength of the first electronically insulating layer but smaller than the yield strength of the second electronically insulating layer, or smaller than the yield strengths of both the first electronically insulating layer and the second electronically insulating layer. Without wishing to be bound by theory, it is believed that an intermediate layer with this property (i.e., a yield strength smaller than the yield strength of one or both of the first electronically insulating layer and the second electronically insulating layer) may be able to trap dendrites by providing a pathway for growth against and/or within the intermediate layer that requires a lower input of mechanical energy than growth through the first electronically insulating layer and/or the second electronically insulating layer. That is, a growing lithium dendrite may be capable of deforming the intermediate layer preferentially to the first electronically insulating layer and/or the second electronically insulating layer.

In some embodiments in which the electronically insulating layer comprises an intermediate layer, the yield strength of the intermediate layer may be less than or equal to 1.2 MPa, less than or equal to 0.8 MPa, or less than or equal to 0.5 MPa. In some embodiments, the yield strength of the intermediate layer may be greater than or equal to 0.2 MPa, greater than or equal to 0.5 MPa, or greater than or equal to 0.8 MPa. Combinations of the above-referenced ranges are also possible (e.g., greater than or equal to 0.2 MPa and less than or equal to 1.2 MPa). Other ranges are also possible.

In some embodiments in which the electronically insulating layer comprises an intermediate layer, the yield strength of the intermediate layer may be less than or equal to 90% of the yield strength of lithium metal, less than or equal to 80% of the yield strength of lithium metal, less than or equal to 50% of the yield strength of lithium metal, less than or equal to 10% of the yield strength of lithium metal, or less than or equal to 1% of the yield strength of lithium metal. In some embodiments, the yield strength of the intermediate layer may be greater than or equal to 0.1% of the yield strength of lithium metal, greater than or equal to 1% of the yield strength of lithium metal, greater than or equal to 10% of the yield strength of lithium metal, greater than or equal to 50% of the yield strength of lithium metal, or greater than or equal to 80% of the yield strength of lithium metal. Combinations of the above-referenced ranges are also possible (e.g., greater than or equal to 0.1% of the yield strength of lithium metal and less than or equal to 90% of the yield strength of lithium metal, or greater than or equal to 1% of the yield strength of lithium metal and less than or equal to 90% of the yield strength of lithium metal). Other ranges are also possible.

In some embodiments in which the electronically insulating layer comprises both a first electronically insulating layer and an intermediate layer, the yield strength of the intermediate layer may be less than or equal to 90% of the yield strength of the first electronically insulating layer, less than or equal to 80% of the yield strength of the first electronically insulating layer, less than or equal to 50% of the yield strength of the first electronically insulating layer, less than or equal to 10% of the yield strength of the first electronically insulating layer, or less than or equal to 1% of the yield strength of the first electronically insulating layer. In some embodiments, the yield strength of the intermediate layer may be greater than or equal to 0.1% of the yield strength of the first electronically insulating layer, greater than or equal to 1% of the yield strength of the first electronically insulating layer, greater than or equal to 10% of the yield strength of the first electronically insulating layer, greater than or equal to 50% of the yield strength of the first electronically insulating layer, or greater than or equal to 80% of the yield strength of the first electronically insulating layer. Combinations of the above-referenced ranges are also possible (e.g., greater than or equal to 0.1% of the yield strength of the first electronically insulating layer and less than or equal to 90% of the yield strength of the first electronically insulating layer, or greater than or equal to 1% of the yield strength of the first electronically insulating layer and less than or equal to 90% of the yield strength of the first electronically insulating layer). Other ranges are also possible.

In some embodiments in which the electronically insulating layer comprises both a second electronically insulating layer and an intermediate layer, the yield strength of the intermediate layer may be less than or equal to 90% of the yield strength of the second electronically insulating layer, less than or equal to 80% of the yield strength of the second electronically insulating layer, less than or equal to 50% of the yield strength of the second electronically insulating layer, less than or equal to 10% of the yield strength of the second electronically insulating layer, or less than or equal to 1% of the yield strength of the second electronically insulating layer. In some embodiments, the yield strength of the intermediate layer may be greater than or equal to 0.1% of the yield strength of the second electronically insulating layer, greater than or equal to 1% of the yield strength of the second electronically insulating layer, greater than or equal to 10% of the yield strength of the second electronically insulating layer, greater than or equal to 50% of the yield strength of the second electronically insulating layer, or greater than or equal to 80% of the yield strength of the second electronically insulating layer. Combinations of the above-referenced ranges are also possible (e.g., greater than or equal to 0.1% of the yield strength of the second electronically insulating layer and less than or equal to 90% of the yield strength of the second electronically insulating layer, or greater than or equal to 1% of the yield strength of the second electronically insulating layer and less than or equal to 90% of the yield strength of the second electronically insulating layer). Other ranges are also possible. A layer having a yield strength with a relatively low value (such as, e.g., less than or equal to the yield strength of lithium metal and/or less than or equal to the yield strength of another layer within the insulating region) may have any suitable composition. In some embodiments, a layer having a yield strength with a relatively low value may be a gel, a polymer, and/or a plasticized polymer. Non-limiting examples of preferred polymers include polyethylene oxide, poly(vinyl alcohol), poly(ether ketone), poly(sulfone), poly (vinylidene fluoride), a poly(vinylidene fluoride-hexafluoropropylene) copolymer (optionally with high hexafluoropropylene content), polyisobutylene, an ethylene propylene diene terpolymer (EP(D)M), a silicone polymer (e.g., poly (dimethyl siloxane)), an acrylate polymer, and/or an acrylic acid copolymer. In some embodiments, a gel may be positioned between two separators.

In some embodiments, the electrochemical cell may comprise an electronically insulating region between the first electrode and the second electrode and the electronically insulating region may comprise internal passageways. In some embodiments, the electronically insulating region may comprise at least a first electronically insulating layer and a second electronically insulating layer, and one or both of the first electronically insulating layer and the second electronically insulating layer may comprise internal passageways. As used herein, an internal passageway is a passageway that does not traverse the full thickness of the electronically insulating region. That is, internal passageways do not extend from one external surface of the electronically insulating region to a second, opposite surface of the electronically insulating region. As used herein, an external surface of the electronically insulating region is a surface that is present at an interface between the electronically insulating region and a different cell component (such as, e.g., an interface between the electronically insulating region and the first electrode, an interface between the electronically insulating region and the second electrode, an interface between the electronically insulating region and an intervening cell component, etc.). Two external surfaces that are opposite to each other are external surfaces that are positioned at different distances from the first electrode (such as, e.g., the surface of the electronically insulating region closest to the first electrode and the surface of the electronically insulating region furthest from the first electrode). Typically, ions flow from through the electronically insulating region from one external surface to its opposite during charge and discharge of the electrochemical cell.

In some embodiments, the electronically insulating region may comprise internal passageways that are fully enclosed internal passageways. "Fully enclosed" internal passageways are internal passageways contained wholly within the bulk of the electronically insulating region (i.e., they do not extend to any external surfaces of the electronically insulating region). In some embodiments, the electronically insulating region may comprise internal passageways that are semi-enclosed internal passageways, or internal passageways that extend to one external surface of the electronically insulating region but not a second, opposite surface of the electronically insulating region. It should also be understood that any layers within the electronically insulating region (e.g., a first electronically insulating layer, a second electronically insulating layer), if present, may also comprise enclosed internal passageways and/or semi-enclosed internal passageways.

Figure 6:
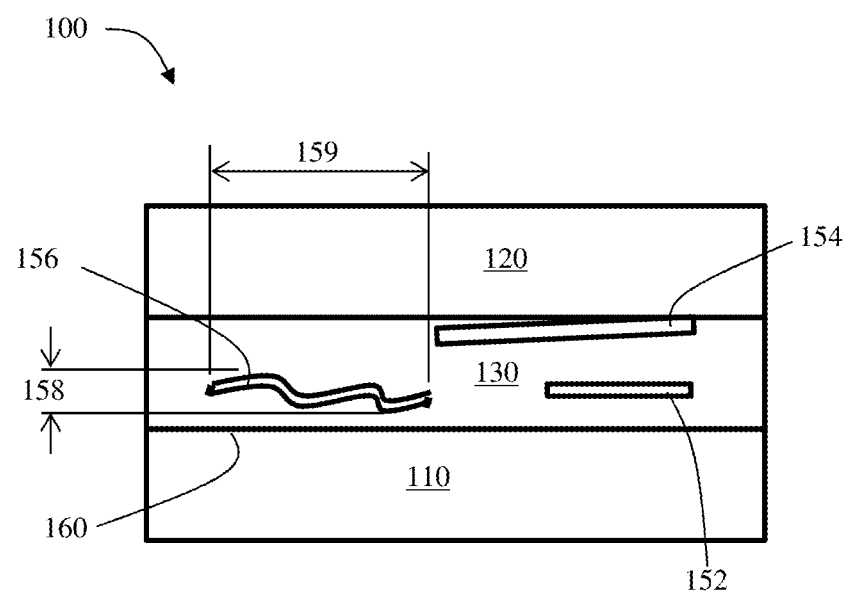
FIG. 6 shows, in accordance with some embodiments, a cross-sectional schematic illustration comprising internal passageways within an electronically insulating region.

In some embodiments, the electronically insulating region and/or any layers therein (e.g., a first electronically insulating layer, a second electronically insulating layer), if present, may comprise internal passageways, and the internal passageways may extend laterally across at least a portion of the electronically insulating region and/or any layers therein. According to certain embodiments, the internal passageways may extend for a longer distance in at least one direction that is parallel to the surface of the first electrode that faces the electronically insulating region than in the direction perpendicular to the surface of the first electrode that faces the electronically insulating region. FIG. 6 shows several non-limiting examples of internal passageways that extend laterally across the electronically insulating region. In some embodiments, the internal passageways may extend only in directions that are parallel to the surface of the first electrode that faces the insulating region. For example, referring to FIG. 6, internal passageway 152 is parallel to the surface of the first electrode that faces the electronically insulating region, while internal passageways 154 and 156 are not. In some embodiments, the maximum lateral distance (i.e., taken in a direction parallel to the surface of the first electrode that faces the electronically insulating region) spanned by the internal passageway can be at least 2 times, at least 5 times, at least 10 times, or at least 100 times the maximum thickness distance (i.e., taken in a direction perpendicular to the surface of the first electrode that faces the electronically insulating region) spanned by the internal passageway. For example, referring to FIG. 6, internal passageway 156 spans a maximum lateral distance (taken in a direction parallel to surface 160 of first electrode 110, which faces electronically insulating region 130) indicated by dimension 159. Internal passageway 156 also spans a maximum thickness distance (taken in a direction perpendicular to surface 160 of first electrode 110) indicated by dimension 158. In FIG. 6, the maximum lateral distance spanned by internal passageway 156 (indicated by dimension 159) is about 4 times the maximum thickness distance spanned by the internal passageway (indicated by dimension 158). That is to say, dimension 159 is about 4 times longer than dimension 158.

Internal passageways (that extend laterally or otherwise) may be created by any suitable means. In a first non-limiting example, a membrane comprising spherical and/or ovoid pores may be stretched anisotropically to create laterally elongated pores. In a second non-limiting example, high aspect ratio fillers (such as, e.g., fibers) can be incorporated into a matrix and then removed from the matrix (by, e.g., dissolution in a solvent) to yield a matrix comprising internal passageways that extend laterally.

In some embodiments, the electronically insulating region may comprise internal passageways and at least a portion (e.g., at least 30%, at least 50%) of the internal passageways have lengths of at least 5 nm, at least 10 nm, at least 20 nm, at least 50 nm, or at least 100 nm. In some embodiments, at least a portion (e.g., at least 30%, at least 50%) of the internal passageways have lengths of at most 200 nm, at most 100 nm, at most 50 nm, at most 20 nm, or at most 10 nm. Combinations of the above-referenced ranges are also possible (e.g., at least 30% of the internal passageways have lengths of at least 5 nm and at most 200 nm, or at least 50% of the internal passageways have lengths of at least 5 nm and at most 200 nm). Other ranges are also possible. The lengths of the internal passageways may be determined by cross-sectional SEM imaging.

In some embodiments, the electronically insulating region may comprise a first layer, and the first layer may comprise internal passageways. In some such embodiments, at least a portion (e.g., at least 30%, at least 50%) of the internal passageways in the first electronically insulating layer have lengths of at least 5 nm, at least 10 nm, at least 20 nm, at least 50 nm, or at least 100 nm. In some embodiments, at least a portion (e.g., at least 30%, at least 50%) of the internal passageways have lengths of at most 200 nm, at most 100 nm, at most 50 nm, at most 20 nm, or at most 10 nm. Combinations of the above-referenced ranges are also possible (e.g., at least 30% of the internal passageways have lengths of at least 5 nm and at most 200 nm, or at least 50% of the internal passageways have lengths of at least 5 nm and at most 200 nm). Other ranges are also possible.

In some embodiments, the electronically insulating region may comprise a second layer, and the second layer may comprise internal passageways. In some such embodiments, at least a portion (e.g., at least 30%, at least 50%) of the internal passageways in the second electronically insulating layer have lengths of at least 5 nm, at least 10 nm, at least 20 nm, at least 50 nm, or at least 100 nm. In some embodiments, at least a portion (e.g., at least 30%, at least 50%) of the internal passageways have lengths of at most 200 nm, at most 100 nm, at most 50 nm, at most 20 nm, or at most 10 nm. Combinations of the above-referenced ranges are also possible (e.g., at least 30% of the internal passageways have lengths of at least 5 nm and at most 200 nm, or at least 50% of the internal passageways have lengths of at least 5 nm and at most 200 nm). Other ranges are also possible.

In some embodiments, the electronically insulating region may comprise internal passageways and at least a portion (e.g., at least 30%, at least 50%) of the internal passageways have a maximum cross-sectional diameter of at least 5 nm, at least 10 nm, at least 20 nm, at least 50 nm, or at least 100 nm. In some embodiments, at least a portion (e.g., at least 30%, at least 50%) of the internal passageways have a maximum cross-sectional diameter of at most 200 nm, at most 100 nm, at most 50 nm, at most 20 nm, or at most 10 nm. Combinations of the above-referenced ranges are also possible (e.g., at least 30% of the internal passageways have a cross-sectional diameter of at least 5 nm and at most 200 nm, or at least 50% of the internal passageways have a cross-sectional diameter of at least 5 nm and at most 200 nm). Other ranges are also possible. The maximum cross-sectional diameter of an internal passageway may be determined by cross-sectional SEM imaging.

In some embodiments, the electronically insulating region may comprise a first electronically insulating layer, and the first electronically insulating layer may comprise internal passageways. In some such embodiments, at least a portion (e.g., at least 30%, at least 50%) of the internal passageways in the first electronically insulating layer have a maximum cross-sectional diameter of at least 5 nm, at least 10 nm, at least 20 nm, at least 50 nm, or at least 100 nm. In some embodiments, at least a portion (e.g., at least 30%, at least 50%) of the internal passageways have a maximum cross-sectional diameter of at most 200 nm, at most 100 nm, at most 50 nm, at most 20 nm, or at most 10 nm. Combinations of the above-referenced ranges are also possible (e.g., at least 30% of the internal passageways have a cross-sectional diameter of at least 5 nm and at most 200 nm, or at least 50% of the internal passageways have a cross-sectional diameter of at least 5 nm and at most 200 nm).

In some embodiments, the electronically insulating region may comprise a second electronically insulating layer, and the second electronically insulating layer may comprise internal passageways. In some such embodiments, at least a portion (e.g., at least 30%, at least 50%) of the internal passageways in the second electronically insulating layer have a maximum cross-sectional diameter of at least 5 nm, at least 10 nm, at least 20 nm, at least 50 nm, or at least 100 nm. In some embodiments, at least a portion (e.g., at least 30%, at least 50%) of the internal passageways have a maximum cross-sectional diameter of at most 200 nm, at most 100 nm, at most 50 nm, at most 20 nm, or at most 10 nm. Combinations of the above-referenced ranges are also possible (e.g., at least 30% of the internal passageways have a cross-sectional diameter of at least 5 nm and at most 200 nm, or at least 50% of the internal passageways have a cross-sectional diameter of at least 5 nm and at most 200 nm).

In some embodiments, the electrochemical cell may comprise an electronically insulating region, and the electronically insulating region may comprise pores. As described above, some embodiments comprise an electronically insulating region with one or more layers. In certain embodiments, at least one of the first electronically insulating layer and the second electronically insulating layer comprises pores. The first electronically insulating layer, and/or the second electronically insulating layer may comprise pores with a size distribution chosen to enhance the performance of the electrochemical cell. In some cases, the pores may be smaller than millimeter-scale pores. This may be advantageous because millimeter-scale pores may be so large that they render the layer mechanically unstable. In some embodiments, it may be advantageous to use an electronically insulating region, a first electronically insulating layer, and/or a second electronically insulating layer wherein the pores have cross-sectional diameters within a designated range. For example, in some cases, the electronically insulating region, first electronically insulating layer, and/or the second electronically insulating layer may comprise pores wherein at least 50% of the pore volume, at least 75% of the pore volume, or at least 90% of the pore volume is made up of pores with a cross-sectional diameter of greater than or equal to 0.001 microns, greater than or equal to 0.002 microns, greater than or equal to 0.005 microns, greater than or equal to 0.01 microns, greater than or equal to 0.02 microns, greater than or equal to 0.05 microns, greater than or equal to 0.1 microns, or greater than or equal to 0.2 microns. In some cases, the electronically insulating region, the first electronically insulating layer, and/or the second electronically insulating layer may comprise pores wherein at least 50% of the pore volume, at least 75% of the pore volume, or at least 90% of the pore volume is made up of pores with a cross-sectional diameter of less than or equal to 0.5 microns, less than or equal to 0.2 microns, less than or equal to 0.1 microns, less than or equal to 0.05 microns, less than or equal to 0.02 microns, less than or equal to 0.01 microns, less than or equal to 0.005 microns, or less than or equal to 0.002 microns. Combinations of the above-referenced ranges are also possible (e.g., greater than or equal to 0.001 microns and less than or equal to 0.5 microns). Other ranges are also possible.

As used herein, the "cross-sectional diameter" of a pore refers to a cross-sectional diameter as measured using ASTM Standard Test D4284-07. One of ordinary skill in the art would be capable of calculating the distribution of cross-sectional diameters and the average cross-sectional diameter of the pores within a layer using mercury intrusion porosimetry as described in ASTM standard D4284-07, which is incorporated herein by reference in its entirety. For example, the methods described in ASTM standard D4284-07 can be used to produce a distribution of pore sizes plotted as the cumulative intruded pore volume as a function of pore diameter. To calculate the fraction of the total pore volume within the sample that is occupied by pores within a given range of pore diameters, one would: (1) calculate the area under the curve that spans the given range over the x-axis, and (2) divide the area calculated in step (1) by the total area under the curve. Optionally, in cases where the article includes pore sizes that lie outside the range of pore sizes that can be accurately measured using ASTM standard D4284-07, porosimetry measurements may be supplemented using BET surface analysis, as described, for example, in S. Brunauer, P. H. Emmett, and E. Teller, J. Am. Chem. Soc., 1938, 60, 309, which is incorporated herein by reference in its entirety.

In some embodiments, the electrochemical cell may comprise an electronically insulating region, and the electronically insulating region may comprise pores with relatively uniform cross-sectional diameters. In some embodiments, the electronically insulating region may comprise at least a first electronically insulating layer and a second electronically insulating layer, and the first electronically insulating layer and/or the second electronically insulating layer may comprise pores with relatively uniform cross-sectional diameters. Not wishing to be bound by any theory, such uniformity may be useful in maintaining relatively consistent structural stability throughout the bulk of the layer. In addition, the ability to control the pore size to within a relatively narrow range can allow one to incorporate a large number of pores that are large enough to allow for fluid penetration (e.g., electrolyte penetration, or penetration of a liquid component of the electrolyte) while maintaining sufficiently small pores to preserve structural stability of the porous material. In some embodiments, the distribution of the cross-sectional diameters of the pores within the electronically insulating region, first electronically insulating layer and/or the second electronically insulating layer can have a standard deviation of less than about 50%, less than about 25%, less than about 10%, less than about 5%, less than about 2%, or less than about 1% of the average cross-sectional diameter of the plurality of pores. Standard deviation (lower-case sigma) is given its normal meaning in the art, and can be calculated as:

$$\sigma = \sqrt{\frac{\sum_{i=1}^{n}(D_i - D_{avg})^2}{n-1}}$$

wherein $D_i$ is the cross-sectional diameter of pore i, $D_{avg}$ is the average of the cross-sectional diameters of the plurality of pores, and n is the number of pores. The percentage comparisons between the standard deviation and the average cross-sectional diameters of the pores outlined above can be obtained by dividing the standard deviation by the average and multiplying by 100%.

In some embodiments, the electronically insulating region may comprise pores, and at least a portion of the pores may extend from one external surface of the electronically insulating region to a second, opposite external surface of the electronically insulating region. That is, the electronically insulating region may comprise pores that are not internal passageways.

In some embodiments, the electronically insulating region may comprise a first electronically insulating layer, and the first electronically insulating layer may comprise pores. In some such embodiments, at least a portion of the pores may extend from one external surface of the first electronically insulating layer to a second, opposite external surface of the first electronically insulating layer. That is, the first electronically insulating layer may comprise pores that are not internal passageways.

In some embodiments, the electronically insulating region may comprise a second electronically insulating layer, and the second electronically insulating layer may comprise pores. In some such embodiments, at least a portion of the pores may extend from one external surface of the second electronically insulating layer to a second, opposite external surface of the second electronically insulating layer. That is, the second electronically insulating layer may comprise pores that are not internal passageways.

In some embodiments in which the electrochemical cell comprises an electronically insulating region and the electronically insulating region may comprise pores, the pores may occupy any suitable percentage of the volume of the electronically insulating region. The volume occupied by the pores of the electronically insulating region may be determined by measuring the volume enclosed by the outer boundary of the region (e.g., by use of a ruler), measuring the pore volume of the externally insulating region by employing ASTM standard D4284-07 as described above, dividing the measured pore volume by the volume enclosed by the electronically insulating region, and multiplying by 100%.

In some embodiments, the electronically insulating region does not qualify as a gel. As used herein, the term "gel" refers to a three-dimensional network comprising a liquid and a solid component, in which the liquid is entrained by and not allowed to flow through the solid. Generally, the gel as a whole does not flow when at standard temperature and pressure. The liquid component of the gel makes up, according to certain embodiments, at least 80 vol %, at least 85 vol %, at least 90 vol %, or at least 95 vol % of the overall gel volume. Gels can be formed when liquids are entrained within a three-dimensional network of solids upon applying the liquid to the solid network. In some cases, the gel comprises a liquid entrained within a polymer (e.g., a cross-linked polymer).

According to certain embodiments, the electronically insulating region has a relatively high electrolyte permeability (i.e., the permeability of the liquid component of the electrolyte). The electrolyte permeability of a layer may be measured by the Gurley Test. The Gurley Test determines the time required for a specific volume of air to flow through a standard area of the material. As such, larger air permeation times (Gurley seconds) generally correspond to better barrier properties. The air permeation times and Gurley tests described herein refer to those performed according to TAPPI Standard T 536 om-12, which involves a pressure differential of 3 kPa and a sample size of one square inch. In certain embodiments, the electronically insulating region has an electrolyte permeability of greater than or equal to 10 Gurley seconds, greater than or equal to 20 Gurley seconds, greater than or equal to 50 Gurley seconds, greater than or equal to 100 Gurley seconds, greater than or equal to 200 Gurley seconds, or greater than or equal to 500 Gurley seconds. In certain embodiments, the electronically insulating region has an electrolyte permeability of less than or equal to 1000 Gurley seconds, less than or equal to 500 Gurley seconds, less than or equal to 250 Gurley seconds, less than or equal to 100 Gurley seconds, less than or equal to 50 Gurley seconds, or less than or equal to 20 Gurley seconds. Combinations of the above-referenced ranges are also possible (e.g., greater than or equal to 50 Gurley seconds and less than or equal to 1000 Gurley seconds). Other ranges are also possible.

In some embodiments in which the electronically insulating region comprises at least one layer, the first electronically insulating layer has a relatively high electrolyte permeability. In certain embodiments, the first electronically insulating layer has an electrolyte permeability of greater than or equal to 10 Gurley seconds, greater than or equal to 20 Gurley seconds, greater than or equal to 50 Gurley seconds, greater than or equal to 100 Gurley seconds, greater than or equal to 200 Gurley seconds, or greater than or equal to 500 Gurley seconds. In certain embodiments, the first electronically insulating layer has an electrolyte permeability of less than or equal to 1000 Gurley seconds, less than or equal to 500 Gurley seconds, less than or equal to 250 Gurley seconds, less than or equal to 100 Gurley seconds, less than or equal to 50 Gurley seconds, or less than or equal to 20 Gurley seconds. Combinations of the above-referenced ranges are also possible (e.g., greater than or equal to 50 Gurley seconds and less than or equal to 1000 Gurley seconds). Other ranges are also possible.

In some embodiments in which the electronically insulating region comprises at least two layers, the second electronically insulating layer has a relatively high electrolyte permeability. In certain embodiments, the second electronically insulating layer has an electrolyte permeability of greater than or equal to 10 Gurley seconds, greater than or equal to 20 Gurley seconds, greater than or equal to 50 Gurley seconds, greater than or equal to 100 Gurley seconds, greater than or equal to 200 Gurley seconds, or greater than or equal to 500 Gurley seconds. In certain embodiments, the second electronically insulating layer has an electrolyte permeability of less than or equal to 1000 Gurley seconds, less than or equal to 500 Gurley seconds, less than or equal to 250 Gurley seconds, less than or equal to 100 Gurley seconds, less than or equal to 50 Gurley seconds, or less than or equal to 20 Gurley seconds. Combinations of the above-referenced ranges are also possible (e.g., greater than or equal to 50 Gurley seconds and less than or equal to 1000 Gurley seconds). Other ranges are also possible.

In some embodiments in which the electronically insulating region comprises at least two layers, both the first electronically insulating layer and the second electronically insulating layer have relatively high electrolyte permeabilities. In certain embodiments, each of the first electronically insulating layer and the second electronically insulating layer have an electrolyte permeability of greater than or equal to 10 Gurley seconds, greater than or equal to 20 Gurley seconds, greater than or equal to 50 Gurley seconds, greater than or equal to 100 Gurley seconds, greater than or equal to 200 Gurley seconds, or greater than or equal to 500 Gurley seconds. In certain embodiments, each of the first electronically insulating layer and the second electronically insulating layer have an electrolyte permeability of less than or equal to 1000 Gurley seconds, less than or equal to 500 Gurley seconds, less than or equal to 250 Gurley seconds, less than or equal to 100 Gurley seconds, less than or equal to 50 Gurley seconds, or less than or equal to 20 Gurley seconds. Combinations of the above-referenced ranges are also possible (e.g., greater than or equal to 50 Gurley seconds and less than or equal to 1000 Gurley seconds). Other ranges are also possible.

According to certain embodiments, the electronically insulating region may comprise three, four, or more layers. Each of these layers may independently have a relatively high electrolyte permeability (e.g., greater than or equal to 50 Gurley seconds, greater than or equal to 500 Gurley seconds). In some embodiments, each layer has an electrolyte permeability of greater than or equal to 50 Gurley seconds or greater than or equal to 500 Gurley seconds.

In accordance with some embodiments, the electronically insulating region may have a relatively low electronic conductivity. In certain embodiments, the electronically insulating region may have an electronic conductivity of less than or equal to $10^{-5}$ S/cm, less than or equal to $10^{-6}$ S/cm, less than or equal to $10^{-7}$ S/cm, less than or equal to $10^{-8}$ S/cm, less than or equal to 10 S/cm, less than or equal to $10^{-10}$ S/cm, less than or equal to $10^{-11}$ S/cm, less than or equal to $10^{-12}$ S/cm, less than or equal to $10^{-13}$ S/cm, or less than or equal to $10^{-14}$ S/cm. In certain embodiments, the electronically insulating region may have an electronic conductivity of greater than or equal to $10^{-15}$ S/cm, greater than or equal to $10^{-14}$ S/cm, greater than or equal to $10^{-13}$ S/cm, greater than or equal to $10^{-12}$ S/cm, greater than or equal to $10^{-11}$ S/cm, greater than or equal to $10^{-10}$ S/cm, greater than or equal to $10^{-9}$ S/cm, greater than or equal to $10^{-8}$ S/cm, or greater than or equal to $10^{-6}$ S/cm. Combinations of the above-referenced ranges are also possible (e.g., greater than or equal to $10^{-15}$ S/cm and less than or equal to $10^{-7}$ S/cm). Other ranges are also possible. The electronic conductivity may be determined by electrochemical impedance spectroscopy, as described above.

In accordance with some embodiments, the electronically insulating region may comprise a first electronically insulating layer, and the first electronically insulating layer may have a relatively low electronic conductivity. In certain embodiments, the first electronically insulating layer may have an electronic conductivity of less than or equal to $10^{-5}$ S/cm, less than or equal to $10^{-6}$ S/cm, less than or equal to $10^{-7}$ S/cm, less than or equal to $10^{-8}$ S/cm, less than or equal to 10 S/cm, less than or equal to $10^{-10}$ S/cm, less than or equal to $10^{-11}$ S/cm, less than or equal to $10^{-12}$ S/cm, less than or equal to $10^{-13}$ S/cm, or less than or equal to $10^{-14}$ S/cm. In certain embodiments, the first electronically insulating layer may have an electronic conductivity of greater than or equal to $10^{-15}$ S/cm, greater than or equal to $10^{-14}$ S/cm, greater than or equal to $10^{-13}$ S/cm, greater than or equal to $10^{-12}$ S/cm, greater than or equal to $10^{-11}$ S/cm, greater than or equal to $10^{-10}$ S/cm, greater than or equal to 10 S/cm, greater than or equal to $10^{-8}$ S/cm, greater than or equal to $10^{-7}$ S/cm, or greater than or equal to $10^{-6}$ S/cm. Combinations of the above-referenced ranges are also possible (e.g., greater than or equal to $10^{-15}$ S/cm and less than or equal to $10^{-7}$ S/cm). Other ranges are also possible.

In accordance with some embodiments, the electronically insulating region may comprise a second electronically insulating layer, and the second electronically insulating layer may have a relatively low electronic conductivity. In certain embodiments, the second electronically insulating layer may have an electronic conductivity of less than or equal to $10^{-5}$ S/cm, less than or equal to $10^{-6}$ S/cm, less than or equal to $10^{-7}$ S/cm, less than or equal to $10^{-8}$ S/cm, less than or equal to $10^{-9}$ S/cm, less than or equal to $10^{-10}$ S/cm, less than or equal to $10^{-11}$ S/cm, less than or equal to $10^{-12}$ S/cm, less than or equal to $10^{-13}$ S/cm, or less than or equal to $10^{-14}$ S/cm. In certain embodiments, the second electronically insulating layer may have an electronic conductivity of greater than or equal to $10^{-15}$ S/cm, greater than or equal to $10^{-14}$ S/cm, greater than or equal to $10^{-13}$ S/cm, greater than or equal to $10^{-12}$ S/cm, greater than or equal to $10^{-11}$ S/cm, greater than or equal to $10^{-10}$ S/cm, greater than or equal to $10^{-9}$ S/cm, greater than or equal to $10^{-8}$ S/cm, greater than or equal to $10^{-7}$ S/cm, or greater than or equal to $10^{-6}$ S/cm. Combinations of the above-referenced ranges are also possible (e.g., greater than or equal to $10^{-15}$ S/cm and less than or equal to $10^{-7}$ S/cm). Other ranges are also possible.

In some embodiments, the electronically insulating region may have a relatively high ionic conductivity. In certain embodiments, the electronically insulating region may have an ionic conductivity of greater than or equal to $10^{-7}$ S/cm, greater than or equal to $10^{-6}$ S/cm, greater than or equal to $10^{-5}$ S/cm, greater than or equal to $10^{-4}$ S/cm, greater than or equal to $10^{-3}$ S/cm, greater than or equal to $10^{-2}$ S/cm, greater than or equal to $10^{-1}$ S/cm, greater than or equal to 1 S/cm, or greater than or equal to 10 S/cm. In certain embodiments, the electronically insulating region may have an ionic conductivity of less than or equal to 100 S/cm, less than or equal to 10 S/cm, less than or equal to 1 S/cm, less than or equal to $10^{-1}$ S/cm, less than or equal to $10^{-2}$ S/cm, less than or equal to $10^{-3}$ S/cm, less than or equal to $10^{-4}$ S/cm, less than or equal to $10^{-5}$ S/cm, or less than or equal to $10^{-6}$ S/cm. Combinations of the above-referenced ranges are also possible (e.g., greater than or equal to $10^{-4}$ S/cm and less than or equal to 100 S/cm). Other ranges are also possible. The ionic conductivity of the electronically insulating region may be determined using electrochemical impedance spectroscopy as described above.

In some embodiments in which the electronically insulating region comprises at least one layer, the first electronically insulating layer may have a relatively high ionic conductivity. In certain embodiments, the first electronically insulating layer may have an ionic conductivity of greater than or equal to $10^{-7}$ S/cm, greater than or equal to $10^{-6}$ S/cm, greater than or equal to $10^{-5}$ S/cm, greater than or equal to $10^{-4}$ S/cm, greater than or equal to $10^{-6}$ S/cm, greater than or equal to $10^{-2}$ S/cm, greater than or equal to $10^{-1}$ S/cm, greater than or equal to 1 S/cm, or greater than or equal to 10 S/cm. In certain embodiments, the first electronically insulating layer may have an ionic conductivity of less than or equal to 100 S/cm, less than or equal to 10 S/cm, less than or equal to 1 S/cm, less than or equal to $10^{-1}$ S/cm, less than or equal to $10^{-2}$ S/cm, less than or equal to $10^{-3}$ S/cm, less than or equal to $10^{-4}$ S/cm, less than or equal to $10^{-5}$ S/cm, or less than or equal to $10^{-6}$ S/cm. Combinations of the above-referenced ranges are also possible (e.g., greater than or equal to $10^{-4}$ S/cm and less than or equal to 100 S/cm). Other ranges are also possible.

In some embodiments in which the electronically insulating region comprises at least two layers, the second electronically insulating layer may have a relatively high ionic conductivity. In certain embodiments, the first electronically insulating layer may have an ionic conductivity of greater than or equal to $10^{-7}$ S/cm, greater than or equal to $10^{-6}$ S/cm, greater than or equal to $10^{-5}$ S/cm, greater than or equal to $10^{-4}$ S/cm, greater than or equal to $10^{-3}$ S/cm, greater than or equal to $10^{-2}$ S/cm, greater than or equal to $10^{-1}$ S/cm, greater than or equal to 1 S/cm, or greater than or equal to 10 S/cm. In certain embodiments, the second electronically insulating layer may have an ionic conductivity of less than or equal to 100 S/cm, less than or equal to 10 S/cm, less than or equal to 1 S/cm, less than or equal to $10^{-1}$ S/cm, less than or equal to $10^{-2}$ S/cm, less than or equal to $10^{-3}$ S/cm, less than or equal to $10^{-4}$ S/cm, less than or equal to $10^{-5}$ S/cm, or less than or equal to $10^{-6}$ S/cm. Combinations of the above-referenced ranges are also possible (e.g., greater than or equal to $10^{-4}$ S/cm and less than or equal to 100 S/cm). Other ranges are also possible.

In some embodiments in which the electronically insulating region comprises at least two layers, the first electronically insulating layer and the second electronically insulating layer may both have relatively high ionic conductivities. In certain embodiments, the first electronically insulating layer and the second electronically insulating layer may each have an ionic conductivity of greater than or equal to $10^{-7}$ S/cm, greater than or equal to $10^{-6}$ S/cm, greater than or equal to $10^{-5}$ S/cm, greater than or equal to $10^{-4}$ S/cm, greater than or equal to $10^{-3}$ S/cm, greater than or equal to $10^{-2}$ S/cm, greater than or equal to $10^{-1}$ S/cm, greater than or equal to 1 S/cm, or greater than or equal to 10 S/cm. In certain embodiments, the first electronically insulating layer and the second electronically insulating layer may each have an ionic conductivity of less than or equal to 100 S/cm, less than or equal to 10 S/cm, less than or equal to 1 S/cm, less than or equal to $10^{-1}$ S/cm, less than or equal to $10^{-2}$ S/cm, less than or equal to $10^{-3}$ S/cm, less than or equal to $10^{-4}$ S/cm, less than or equal to $10^{-5}$ S/cm, or less than or equal to $10^{-6}$ S/cm. Combinations of the above-referenced ranges are also possible (e.g., greater than or equal to $10^{-4}$ S/cm and less than or equal to 100 S/cm). Other ranges are also possible.

According to certain embodiments, the electronically insulating region may comprise three, four, or more layers. Each of these layers may independently have a relatively high ionic conductivity (e.g., greater than or equal to $10^{-4}$ S/cm). In some embodiments, each layer has an ionic conductivity of greater than or equal to $10^{-4}$ S/cm.

In some embodiments in which the electronically insulating region comprises at least two layers, the first electronically insulating layer and the second electronically insulating layer may have values of ionic conductivity that are relatively close together. As used herein, the ionic conductivity of the second electronically insulating layer is within a certain percentage (X %) of the conductivity of the first electronically insulating layer if the following equation is true:

$$\left| \frac{\left(\begin{array}{c}\text{Ionic conductivity of the second layer} - \\ \text{Ionic conductivity of the first layer}\end{array}\right)}{(\text{Ionic } conductivit \text{ of the first layer})} \right| * 100\% \leq X\%.$$

In some embodiments, the ionic conductivity of the second electronically insulating layer is within 1% of the ionic conductivity of the first electronically insulating layer, within 2% of the ionic conductivity of the first electronically insulating layer, within 5% of the ionic conductivity of the first electronically insulating layer, within 10% of the ionic conductivity of the first electronically insulating layer, within 15% of the ionic conductivity of the first electronically insulating layer, within 20%, or within 50% of the ionic conductivity of the first electronically insulating layer.

In some embodiments, the electronically insulating region may comprise one or more polymers. In certain embodiments where the electronically insulating region comprises at least one layer, the first electronically insulating layer may comprise one or more polymers. In certain embodiments where the electronically insulating region comprises at least two layers, at least one of the first electronically insulating layer and the second electronically insulating layer comprises a polymer. In certain embodiments where the electronically insulating region comprises at least two layers, each of the first electronically insulating layer and the second electronically insulating layer comprises a polymer. If electronically insulating region comprises more than two layers (such as three, four, or more), each of the layers may independently comprise a polymer or not comprise a polymer. In some embodiments, each layer within the electronically insulating region comprises a polymer. Non-limiting examples of suitable polymers include polyamines (e.g., poly(ethylene imine) and polypropylene imine (PPI)); polyamides (e.g., polyamide (Nylon), poly(e-caprolactam) (Nylon 6), poly(hexamethylene adipamide) (Nylon 66)), polyimides (e.g., polyimide, polynitrile, and poly (pyromellitimide-1,4-diphenyl ether) (Kapton)); vinyl polymers (e.g., polyacrylamide, poly(2-vinyl pyridine), poly (N-vinylpyrrolidone), poly(methylcyanoacrylate), poly(ethylcyanoacrylate), poly(butylcyanoacrylate), poly(isobutylcyanoacrylate), poly(vinyl acetate), poly(vinyl alcohol), poly(vinyl chloride), poly(vinyl fluoride), poly(2-vinyl pyridine), vinyl polymer, polychlorotrifluoro ethylene, and poly (isohexylcynaoacrylate)); polyacetals; polyolefins (e.g., poly(butene-1), poly(n-pentene-2), polyethylene, polypropylene, polytetrafluoroethylene); polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from the group consisting of poly(vinyl alcohol), polyisobutylene, epoxy, polyethylene, polypropylene, polytetrafluoroethylene, and combinations thereof.

In some embodiments, the electronically insulating region (and/or any layers that may be therein) may comprise one or more non-polymeric materials. In certain embodiments, the electronically insulating region (and/or any layers that may be therein) may comprise a ceramic. For example, a ceramic coating may be applied to the electronically insulating region or layer(s), a ceramic material may be present throughout the thickness of the electronically insulating region or layer(s), and/or the electronically insulating region may comprise a ceramic layer or layers. Non-limiting examples of suitable ceramics include alumina, boehmite, oxides, and ceramics that conduct lithium ions.

In some embodiments, the electronically insulating region may comprise one or more electronically insulating layers, and at least one electronically insulating layer may be a separator. In some embodiments, each electronically insulating layer may be a separator. In some embodiments, the separator or separators may be a polyolefin separator, such as a microporous polyolefin separator. In some embodiments, the separator may comprise a ceramic that conducts lithium ions, and the separator may also serve as an electrolyte (e.g., in cells with solid electrolytes and/or in all solid state electrochemical cells).

The electrolytes used in electrochemical or battery cells can function as a medium for the storage and transport of ions, and in the special case of solid electrolytes and gel electrolytes, these materials may additionally function as a separator between the anode and the cathode. Any liquid, solid, or gel material capable of storing and transporting ions may be used, so long as the material facilitates the transport of ions (e.g., lithium ions) between the anode and the cathode. The electrolyte is electronically non-conductive to prevent short circuiting between the anode and the cathode. In some embodiments, the electrolyte may comprise a non-solid electrolyte.

Suitable non-aqueous electrolytes may include organic electrolytes comprising one or more materials selected from the group consisting of liquid electrolytes, gel polymer electrolytes, and solid polymer electrolytes. Examples of non-aqueous electrolytes for lithium batteries are described by Dorniney in Lithium Batteries, New Materials, Developments and Perspectives, Chapter 4, pp. 137-165, Elsevier, Amsterdam (1994). Examples of gel polymer electrolytes and solid polymer electrolytes are described by Alamgir et al. in Lithium Batteries, New Materials, Developments and Perspectives, Chapter 3, pp. 93-136, Elsevier, Amsterdam (1994). Heterogeneous electrolyte compositions that can be used in batteries described herein are described in U.S. patent application Ser. No. 12/312,764, filed May 26, 2009 and entitled "Separation of Electrolytes," by Mikhaylik et al., which is incorporated herein by reference in its entirety.

In some embodiments, a liquid-containing electrolyte may be used in the electrochemical cells described herein. Generally, the choice of electrolyte will depend upon the chemistry of the electrochemical cell, and, in particular, the species of ion that is to be transported between electrodes in the electrochemical cell. Suitable electrolytes can comprise, in some embodiments, one or more ionic electrolyte salts to provide ionic conductivity and one or more liquid electrolyte solvents. Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, cyclic ethers, glymes, polyethers, phosphate esters, siloxanes, dioxolanes (e.g., 1,3-dioxolane), N-alkylpyrrolidones, bis(trifluoromethanesulfonyl)imide, substituted forms of the foregoing, and blends thereof. Fluorinated derivatives of the foregoing are also useful as liquid electrolyte solvents.

In some cases, aqueous solvents can be used as electrolytes for lithium cells. Aqueous solvents can include water, which can contain other components such as ionic salts. In some embodiments, the electrolyte can include species such as lithium hydroxide, or other species rendering the electrolyte basic, so as to reduce the concentration of hydrogen ions in the electrolyte.

Liquid electrolyte solvents can also be useful as plasticizers for gel polymer electrolytes, i.e., electrolytes comprising one or more polymers forming a semi-solid network. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, polysulfones, polyethersulfones, derivatives of the foregoing, copolymers of the foregoing, crosslinked and network structures of the foregoing, and blends of the foregoing, and optionally, one or more plasticizers. In some embodiments, a gel polymer electrolyte comprises between 10-20%, 20-40%, between 60-70%, between 70-80%, between 80-90%, or between 90-95% of a heterogeneous electrolyte by volume.

In some embodiments, one or more solid polymers can be used to form an electrolyte. Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In addition to electrolyte solvents, gelling agents, and polymers as known in the art for forming electrolytes, the electrolyte may further comprise one or more ionic electrolyte salts, also as known in the art, to increase the ionic conductivity.

The electrolyte can comprise one or more ionic electrolyte salts to provide ionic conductivity and one or more liquid electrolyte solvents, gel polymer materials, polymer materials, or liquid-containing materials. In some embodiments, one or more lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, LiN(SO$_2$CF$_3$)$_2$, and lithium bis(fluorosulfonyl)imide (LiFSI)) can be included. Other electrolyte salts that may be useful include lithium polysulfides (Li$_2$S$_x$), and lithium salts of organic ionic polysulfides (LiS$_x$R)$_n$, where x is an integer from 1 to 20, n is an integer from 1 to 3, and R is an organic group, and those disclosed in U.S. Pat. No. 5,538,812 to Lee et al. A range of concentrations of the ionic lithium salts in the solvent may be used such as from about 0.2 m to about 2.0 m (m is moles/kg of solvent). In some embodiments, a concentration in the range between about 0.5 m to about 1.5 m is used.

In some embodiments, the electrolyte comprises one or more room temperature ionic liquids. The room temperature ionic liquid, if present, typically comprises one or more cations and one or more anions. Non-limiting examples of suitable cations include lithium cations and/or one or more quaternary ammonium cations such as imidazolium, pyrrolidinium, pyridinium, tetraalkylammonium, pyrazolium, piperidinium, pyridazinium, pyrimidinium, pyrazinium, oxazolium, and trizolium cations. Non-limiting examples of suitable anions include trifluromethylsulfonate (CF$_3$SO$_3^-$), bis (fluorosulfonyl)imide (N(FSO$_2$)$_2^-$, bis (trifluoromethyl sulfonyl)imide ((CF$_3$SO$_2$)$_2$N$^-$, bis (perfluoroethylsulfonyl) imide((CF$_3$CF$_2$SO$_2$)$_2$N$^-$, and tris(trifluoromethylsulfonyl) methide ((CF$_3$SO$_2$)$_3$C$^-$. Non-limiting examples of suitable ionic liquids include N-methyl-N-propylpyrrolidinium/bis (fluorosulfonyl) imide and 1,2-dimethyl-3-propylimidazolium/bis(trifluoromethanesulfonyl)imide. In some embodiments, the electrolyte comprises both a room temperature ionic liquid and a lithium salt. In some other embodiments, the electrolyte comprises a room temperature ionic liquid and does not include a lithium salt.

In some embodiments, electrochemical cells may further comprise a separator interposed between the cathode and anode. In some embodiments, one or more cell components described above (such as, e.g., a first insulating layer, a second insulating layer, etc.) may be a separator. The separator may be a solid non-conductive or insulative material which separates or insulates the anode and the cathode from each other preventing short circuiting, and which permits the transport of ions between the anode and the cathode. In some embodiments, the porous separator may be permeable to the electrolyte.

The pores of the separator or separators may be partially or substantially filled with electrolyte. Separators may be supplied as porous free standing films which are interleaved with the anodes and the cathodes during the fabrication of cells. Alternatively, the porous separator layer may be applied directly to the surface of one of the electrodes, for example, as described in PCT Publication No. WO 99/33125 to Carlson et al. and in U.S. Pat. No. 5,194,341 to Bagley et al.

A variety of separator materials are known in the art. Examples of suitable solid porous separator materials include, but are not limited to, polyolefins, such as, for example, polyethylenes (e.g., SETELA™ made by Tonen Chemical Corp) and polypropylenes, glass fiber filter papers, poly(vinylidene fluoride), and ceramic materials. For example, in some embodiments, the separator comprises a microporous polyethylene film. Further examples of separators and separator materials suitable for use according to certain embodiments are those comprising a microporous xerogel layer, for example, a microporous pseudo-boehmite layer, which may be provided either as a free standing film or by a direct coating application on one of the electrodes, as described in U.S. Pat. Nos. 6,153,337 and 6,306,545 by Carlson et al. of the common assignee. Solid electrolytes and gel electrolytes may also function as a separator in addition to their electrolyte function.

Any suitable anode can be included in an electrochemical cell described herein (e.g., as a first electrode). In some embodiments, the first electrode comprises lithium (e.g., lithium metal), such as lithium foil, lithium deposited onto a conductive substrate, and lithium alloys (e.g., lithium-aluminum alloys and lithium-tin alloys). Lithium can be contained as one film or as several films, optionally separated. Suitable lithium alloys for use in the aspects described herein can include alloys of lithium and aluminum, magnesium, silicium (silicon), indium, and/or tin.

In some embodiments, the anode active material contains at least 50 wt % lithium. In some cases, the anode active material contains at least 75 wt %, at least 90 wt %, at least 95 wt %, or at least 99 wt % lithium.

In some embodiments, the first electrode is an anode from which a lithium ion is liberated during discharge and into which the lithium ion is integrated (e.g., intercalated) during charge. In some embodiments, the electrode active material of the anode is a lithium intercalation compound (e.g., a compound that is capable of reversibly inserting lithium ions at lattice sites and/or interstitial sites). In some embodiments, the electrode active material of the anode comprises carbon. In certain cases, the electrode active material of the first electrode is or comprises a graphitic material (e.g., graphite). A graphitic material generally refers to a material that comprises a plurality of layers of graphene (e.g., layers comprising carbon atoms arranged in a hexagonal lattice). Adjacent graphene layers are typically attracted to each other via van der Waals forces, although covalent bonds may be present between one or more sheets in some cases. In some cases, the carbon-comprising electrode active material of the anode is or comprises coke (e.g., petroleum coke). In certain embodiments, the electrochemical material of the anode comprises silicon, lithium, and/or any alloys of combinations thereof. In certain embodiments, the electrode active material of the anode comprises lithium titanate ($Li_4Ti_5O_{12}$, also referred to as "LTO"), tin-cobalt oxide, or any combinations thereof.

In some embodiments, the electrode active material of the second electrode comprises a lithium intercalation compound (e.g., a compound that is capable of reversibly inserting lithium ions at lattice sites and/or interstitial sites). In certain cases, the electrode active material of the second electrode comprises a layered oxide. A layered oxide generally refers to an oxide having a lamellar structure (e.g., a plurality of sheets, or layers, stacked upon each other). Non-limiting examples of suitable layered oxides include lithium cobalt oxide ($LiCoO_2$), lithium nickel oxide ($LiNiO_2$), and lithium manganese oxide ($LiMnO_2$). In some embodiments, the layered oxide is lithium nickel manganese cobalt oxide ($LiNi_xMn_yCo_zO_2$, also referred to as "NMC" or "NCM"). In some such embodiments, the sum of x, y, and z is 1. For example, a non-limiting example of a suitable NMC compound is $LiNi_{1/3}Mn_{1/3}Co_{1/3}O_2$. In some embodiments, a layered oxide may have the formula $(Li_2MnO_3)_x(LiMO_2)_{(1-x)}$ where M is one or more of Ni, Mn, and Co. For example, the layered oxide may be $(Li_2MnO_3)_{0.25}(LiNi_{0.3}Co_{0.15}Mn_{0.55}O_2)_{0.75}$. In some embodiments, the layered oxide is lithium nickel cobalt aluminum oxide ($LiNi_xCo_yAl_zO_2$, also referred to as "NCA"). In some such embodiments, the sum of x, y, and z is 1. For example, a non-limiting example of a suitable NCA compound is $LiNi_{0.8}Co_{0.15}Al_{0.05}O_2$. In certain embodiments, the electrode active material of the second electrode is a transition metal polyanion oxide (e.g., a compound comprising a transition metal, an oxygen, and/or an anion having a charge with an absolute value greater than 1). A non-limiting example of a suitable transition metal polyanion oxide is lithium iron phosphate ($LiFePO_4$, also referred to as "LFP"). Another non-limiting example of a suitable transition metal polyanion oxide is lithium manganese iron phosphate ($LiMn_xFe_{1-x}PO_4$, also referred to as "LMFP"). A non-limiting example of a suitable LMFP compound is $LiMn_{0.8}Fe_{0.2}PO_4$. In some embodiments, the electrode active material of the second electrode is a spinel (e.g., a compound having the structure $AB_2O_4$, where A can be Li, Mg, Fe, Mn, Zn, Cu, Ni, Ti, or Si, and B can be Al, Fe, Cr, Mn, or V). A non-limiting example of a suitable spinel is a lithium manganese oxide with the chemical formula $LiM_xMn_{2-x}O_4$ where M is one or more of Co, Mg, Cr, Ni, Fe, Ti, and Zn. In some embodiments, x may equal 0 and the spinel may be lithium manganese oxide ($LiMn_2O_4$, also referred to as "LMO"). Another non-limiting example is lithium manganese nickel oxide ($LiNi_xM_{2-x}O_4$, also referred to as "LMNO"). A non-limiting example of a suitable LMNO compound is $LiNi_{0.5}Mn_{1.5}O_4$. In certain cases, the electrode active material of the second electrode comprises $Li_{1.15}Mn_{0.42}Ni_{0.25}Co_{0.29}O_2$ ("HC-MNC"), lithium carbonate ($Li_2CO_3$), lithium carbides (e.g., $Li_2C_2$, $Li_4C$, $Li_6C_2$, $Li_8C_3$, $Li_6C_3$, $Li_4C_3$, $Li_4C_5$), vanadium oxides (e.g., $V_2O_5$, $V_2O_3$, $V_6O_{13}$), and/or vanadium phosphates (e.g., lithium vanadium phosphates, such as $Li_3V_2(PO_4)_3$), or any combination thereof.

In some embodiments, the electrode active material of the second electrode comprises a conversion compound. For instance, the second electrode may be a lithium conversion electrode/cathode. It has been recognized that a cathode comprising a conversion compound may have a relatively large specific capacity. Without wishing to be bound by a particular theory, a relatively large specific capacity may be achieved by utilizing all possible oxidation states of a compound through a conversion reaction in which more than one electron transfer takes place per transition metal (e.g., compared to 0.1-1 electron transfer in intercalation compounds). Suitable conversion compounds include, but are not limited to, transition metal oxides (e.g., $Co_3O_4$), transition metal hydrides, transition metal sulfides, transition metal nitrides, and transition metal fluorides (e.g., $CuF_2$, $FeF_2$, $FeF_3$). A transition metal generally refers to an element whose atom has a partially filled d sub-shell (e.g., Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, Rf, Db, Sg, Bh, Hs).

In some cases, the electrode active material of the second electrode may be doped with one or more dopants to alter the electrical properties (e.g., electrical conductivity) of the electrode active material. Non-limiting examples of suitable dopants include aluminum, niobium, silver, and zirconium.

In certain embodiments, the electrode active material within an electrode (e.g., within a second electrode, such as within a cathode) can comprise sulfur. In some embodiments, the electrode active material within an electrode can comprise electrode active sulfur-containing materials.

"Electroactive sulfur-containing materials," as used herein, refers to electrode active materials which comprise the element sulfur in any form, wherein the electrochemical activity involves the oxidation or reduction of sulfur atoms or moieties. As an example, the electrode active sulfur-containing material may comprise elemental sulfur (e.g., $S_8$). In some embodiments, the electrode active sulfur-containing material comprises a mixture of elemental sulfur and a sulfur-containing polymer. Thus, suitable electrode active sulfur-containing materials may include, but are not limited to, elemental sulfur, sulfides or polysulfides (e.g., of alkali metals) which may be organic or inorganic, and organic materials comprising sulfur atoms and carbon atoms, which may or may not be polymeric. Suitable organic materials include, but are not limited to, those further comprising heteroatoms, conductive polymer segments, composites, and conductive polymers. In some embodiments, an electrode active sulfur-containing material within an electrode (e.g., a cathode) comprises at least about 40 wt % sulfur. In some cases, the electrode active sulfur-containing material comprises at least about 50 wt %, at least about 75 wt %, or at least about 90 wt % sulfur.

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; U.S. Pat. No. 6,201,100 issued Mar. 13, 2001, to Gorkovenko et al., and PCT Publication No. WO 99/33130. Other suitable electrode active sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723,230, 5,783,330, 5,792,575 and 5,882,819 to Naoi et al. Still further examples of electrode active sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

In some embodiments described herein, a force, or forces, is applied to portions of an electrochemical cell. Such application of force may reduce irregularity or roughening of an electrode surface of the cell (e.g., when lithium metal or lithium alloy anodes are employed), thereby improving performance. Electrochemical cells in which anisotropic forces are applied and methods for applying such forces are described, for example, in U.S. Pat. No. 9,105,938, issued Aug. 11, 2015, published as U.S. Patent Publication No. 2010/0035128 on Feb. 11, 2010, and entitled "Application of Force in Electrochemical Cells," which is incorporated herein by reference in its entirety for all purposes.

The force may comprise, in some instances, an anisotropic force with a component normal to an active surface of the anode of the electrochemical cell. In the embodiments described herein, electrochemical cells (e.g., rechargeable batteries) may undergo a charge/discharge cycle involving deposition of metal (e.g., lithium metal or other active material) on a surface of the anode upon charging and reaction of the metal on the anode surface, wherein the metal diffuses from the anode surface, upon discharging. The uniformity with which the metal is deposited on the anode may affect cell performance. For example, when lithium metal is removed from and/or redeposited on an anode, it may, in some cases, result in an uneven surface. For example, upon redeposition it may deposit unevenly forming a rough surface. The roughened surface may increase the amount of lithium metal available for undesired chemical reactions which may result in decreased cycling lifetime and/or poor cell performance. The application of force to the electrochemical cell has been found, in accordance with certain embodiments described herein, to reduce such behavior and to improve the cycling lifetime and/or performance of the cell.

Figure 7:
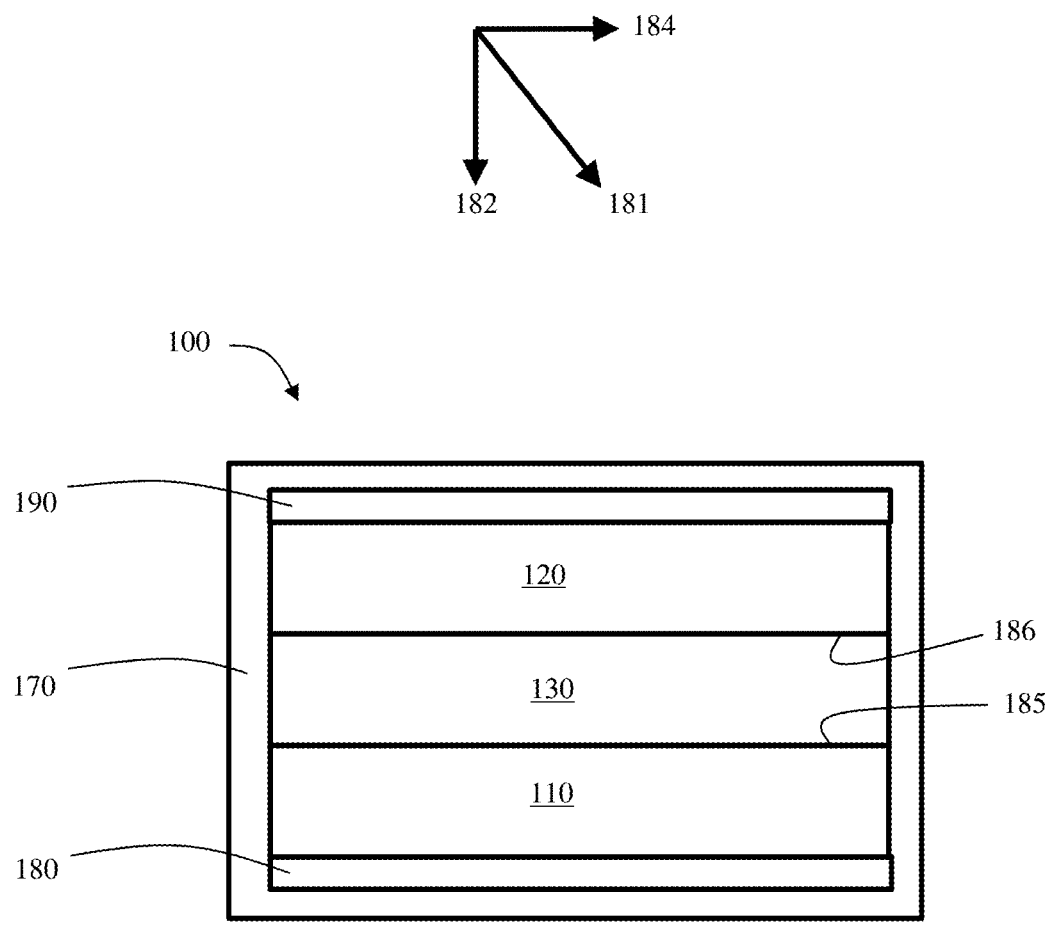
FIG. 7 shows, in accordance with certain embodiments, a cross-sectional schematic illustration of an electrochemical cell to which an anisotropic force is applied.

Referring to FIG. 7, a force may be applied in the direction of arrow 181. Arrow 182 illustrates the component of force 181 that is normal to active surface 185 of electrode 110 (as well as active surface 186 of electrode 120). In the case of a curved surface, for example, a concave surface or a convex surface, the force may comprise an anisotropic force with a component normal to a plane that is tangent to the curved surface at the point at which the force is applied.

In some embodiments, an anisotropic force with a component normal to an active surface of the anode is applied during at least one period of time during charge and/or discharge of the electrochemical cell. In some embodiments, the force may be applied continuously, over one period of time, or over multiple periods of time that may vary in duration and/or frequency. The anisotropic force may be applied, in some cases, at one or more pre-determined locations, optionally distributed over an active surface of the anode. In some embodiments, the anisotropic force is applied uniformly over one or more active surfaces of the anode.

An "anisotropic force" is given its ordinary meaning in the art and means a force that is not equal in all directions. A force equal in all directions is, for example, internal pressure of a fluid or material within the fluid or material, such as internal gas pressure of an object. Examples of forces not equal in all directions include forces directed in a particular direction, such as the force on a table applied by an object on the table via gravity. Another example of an anisotropic force includes certain forces applied by a band arranged around a perimeter of an object. For example, a rubber band or turnbuckle can apply forces around a perimeter of an object around which it is wrapped. However, the band may not apply any direct force on any part of the exterior surface of the object not in contact with the band. In addition, when the band is expanded along a first axis to a greater extent than a second axis, the band can apply a larger force in the direction parallel to the first axis than the force applied parallel to the second axis.

A force with a "component normal" to a surface, for example an active surface of an anode, is given its ordinary meaning as would be understood by those of ordinary skill in the art and includes, for example, a force which at least in part exerts itself in a direction substantially perpendicular to the surface. Those of ordinary skill can understand other examples of these terms, especially as applied within the description of this document.

In some embodiments, the anisotropic force can be applied such that the magnitude of the force is substantially equal in all directions within a plane defining a cross-section of the electrochemical cell, but the magnitude of the forces in out-of-plane directions is substantially unequal to the magnitudes of the in-plane forces.

In one set of embodiments, cells described herein are constructed and arranged to apply, during at least one period of time during charge and/or discharge of the cell, an anisotropic force with a component normal to the active surface of the anode. Those of ordinary skill in the art will understand the meaning of this. In such an arrangement, the cell may be formed as part of a container which applies such a force by virtue of a "load" applied during or after assembly of the cell, or applied during use of the cell as a result of expansion and/or contraction of one or more portions of the cell itself.

The magnitude of the applied force is, in some embodiments, large enough to enhance the performance of the electrochemical cell. An anode active surface and the anisotropic force may be, in some instances, together selected such that the anisotropic force affects surface morphology of the anode active surface to inhibit increase in anode active surface area through charge and discharge and wherein, in the absence of the anisotropic force but under otherwise essentially identical conditions, the anode active surface area is increased to a greater extent through charge and discharge cycles. "Essentially identical conditions," in this context, means conditions that are similar or identical other than the application and/or magnitude of the force. For example, otherwise identical conditions may mean a cell that is identical, but where it is not constructed (e.g., by brackets or other connections) to apply the anisotropic force on the subject cell.

In some embodiments, an anisotropic force with a component normal to an active surface of the anode is applied, during at least one period of time during charge and/or discharge of the cell, to an extent effective to inhibit an increase in surface area of the anode active surface relative to an increase in surface area absent the anisotropic force. The component of the anisotropic force normal to the anode active surface may, for example, define a pressure of at least about 4.9, at least about 9.8, at least about 24.5, at least about 49, at least about 78, at least about 98, at least about 117.6, at least about 147, at least about 175, at least about 200, at least about 225, or at least about 250 Newtons per square centimeter. In some embodiments, the component of the anisotropic force normal to the anode active surface may, for example, define a pressure of less than about 250, less than about 225, less than about 196, less than about 147, less than about 117.6, less than about 98, less than about 49, less than about 24.5, or less than about 9.8 Newtons per square centimeter. In some cases, the component of the anisotropic force normal to the anode active surface is may define a pressure of between about 4.9 and about 147 Newtons per square centimeter, between about 49 and about 117.6 Newtons per square centimeter, between about 68.6 and about 98 Newtons per square centimeter, between about 78 and about 108 Newtons per square centimeter, between about 4.9 and about 250 Newtons per square centimeter, between about 49 and about 250 Newtons per square centimeter, between about 80 and about 250 Newtons per square centimeter, between about 90 and about 250 Newtons per square centimeter, or between about 100 and about 250 Newtons per square centimeter. The force or pressure may, in some embodiments, be externally-applied to the cell, as described herein. While forces and pressures are generally described herein in units of Newtons and Newtons per unit area, respectively, forces and pressures can also be expressed in units of kilograms-force ($kg_f$) and kilograms-force per unit area, respectively. One or ordinary skill in the art will be familiar with kilogram-force-based units, and will understand that 1 kilogram-force is equivalent to about 9.8 Newtons.

As described herein, in some embodiments, the surface of an anode can be enhanced during cycling (e.g., for lithium, the development of mossy or a rough surface of lithium may be reduced or eliminated) by application of an externally-applied (in some embodiments, uniaxial) pressure. The externally-applied pressure may, in some embodiments, be chosen to be greater than the yield stress of a material forming the anode. For example, for an anode comprising lithium, the cell may be under an externally-applied anisotropic force with a component defining a pressure of at least about 8 $kg_f/cm^2$, at least about 9 $kg_f/cm^2$, at least about 10 $kg_f/cm^2$, at least about 15 $kg_f/cm^2$, at least about 20 $kg_f/cm^2$, at least about 25 $kg_f/cm^2$, at least about 30 $kg_f/cm^2$, at least about 35 $kg_f/cm^2$, or at least about 40 $kg_f/cm^2$. This is because the yield stress of lithium is around 7-8 $kg_f/cm^2$. Thus, at pressures (e.g., uniaxial pressures) greater than this value, mossy Li, or any surface roughness at all, may be reduced or suppressed. The lithium surface roughness may mimic the surface that is pressing against it. Accordingly, when cycling under at least about 8 $kg_f/cm^2$, at least about 9 $kg_f/cm^2$, or at least about 10 $kg_f/cm^2$ of externally-applied pressure, the lithium surface may become smoother with cycling when the pressing surface is smooth. As described herein, the pressing surface may be modified by choosing the appropriate material(s) positioned between the anode and the cathode.

In some cases, one or more forces applied to the cell have a component that is not normal to an active surface of an anode. For example, in FIG. 7, force 184 is not normal to active surface 185 of electrode 110. In one set of embodiments, the sum of the components of all applied anisotropic forces in a direction normal to the anode active surface is larger than any sum of components in a direction that is non-normal to the anode active surface. In some embodiments, the sum of the components of all applied anisotropic forces in a direction normal to the anode active surface is at least about 5%, at least about 10%, at least about 20%, at least about 35%, at least about 50%, at least about 75%, at least about 90%, at least about 95%, at least about 99%, or at least about 99.9% larger than any sum of components in a direction that is parallel to the anode active surface.

The anisotropic force described herein may be applied using any suitable method known in the art. In some embodiments, the force may be applied using compression springs. For example, referring to FIG. 7, electrochemical cell 100 may be situated in an optional enclosed containment structure 170 with one or more compression springs situated between current collector 180 and/or current collector 190 and the adjacent wall of containment structure 170 to produce a force with a component in the direction of arrow 182. In some embodiments, the force may be applied by situating one or more compression springs outside the containment structure such that the spring is located between an outside surface of the containment structure and another surface (e.g., a tabletop, the inside surface of another containment structure, an adjacent cell, etc.). Forces may be applied using other elements (either inside or outside a containment structure) including, but not limited to Belleville washers, machine screws, pneumatic devices, and/or weights, among others. For example, in one set of embodiments, one or more cells (e.g., a stack of cells) are arranged between two plates (e.g., metal plates). A device (e.g., a machine screw, a spring, etc.) may be used to apply pressure to the ends of the cell or stack via the plates. In the case of a machine screw, for example, the cells may be compressed between the plates upon rotating the screw. As another example, in some embodiments, one or more wedges may be displaced between a surface of the cell (or the containment structure surrounding the cell) and a fixed surface (e.g., a tabletop, the inside surface of another containment structure, an adjacent cell, etc.). The anisotropic force may be applied by driving the wedge between the cell and the adjacent fixed surface through the application of force on the wedge (e.g., by turning a machine screw).

In some cases, cells may be pre-compressed before they are inserted into containment structures, and, upon being inserted to the containment structure, they may expand to produce a net force on the cell. Such an arrangement may be advantageous, for example, if the cell is capable of withstanding relatively high variations in pressure. In such embodiments, the containment structures may have a relatively high strength (e.g., at least about 100 MPa, at least about 200 MPa, at least about 500 MPa, or at least about 1 GPa). In addition, the containment structure may have a relatively high elastic modulus (e.g., at least about 10 GPa, at least about 25 GPa, at least about 50 GPa, or at least about 100 GPa). The containment structure may comprise, for example, aluminum, titanium, or any other suitable material.

In some embodiments, the use of certain electronically insulating regions and/or methods described herein may result in improved capacity after repeated cycling of the electrochemical cell. For example, in some embodiments, after alternatively discharging and charging the cell three times, the cell exhibits at least about 50%, at least about 80%, at least about 90%, or at least about 95% of the cell's initial capacity at the end of the third cycle. In some cases, after alternatively discharging and charging the cell ten times, the cell exhibits at least about 50%, at least about 80%, at least about 90%, or at least about 95% of the cell's initial capacity at the end of the tenth cycle. In still further cases, after alternatively discharging and charging the cell twenty-five times, the cell exhibits at least about 50%, at least about 80%, at least about 90%, or at least about 95% of the cell's initial capacity at the end of the twenty-fifth cycle. In some embodiments, the electrochemical cell has a capacity of at least 20 mAh at the end of the cell's third, 10th, 25th, 30th, 40th, 45th, 50th, or 60th cycle.

The following applications are incorporated herein by reference, in their entirety, for all purposes: U.S. Patent Publication No. US 2007/0221265, published on Sep. 27, 2007, filed as application Ser. No. 11/400,781 on Apr. 6, 2006, and entitled "Rechargeable Lithium/Water, Lithium/Air Batteries"; U.S. Patent Publication No. US 2009/0035646, published on Feb. 5, 2009, filed as application Ser. No. 11/888,339 on Jul. 31, 2007, and entitled "Swelling Inhibition in Batteries"; U.S. Patent Publication No. US 2010/0129699, published on May 17, 2010, filed as application Ser. No. 12/312,674 on Feb. 2, 2010, patented as U.S. Pat. No. 8,617,748 on Dec. 31, 2013, and entitled "Separation of Electrolytes"; U.S. Patent Publication No. US 2010/0291442, published on Nov. 18, 2010, filed as application Ser. No. 12/682,011 on Jul. 30, 2010, patented as U.S. Pat. No. 8,871,387 on Oct. 28, 2014, and entitled "Primer for Battery Electrode"; U.S. Patent Publication No. US 2009/0200986, published on Aug. 31, 2009, filed as application Ser. No. 12/069,335 on Feb. 8, 2008, patented as U.S. Pat. No. 8,264,205 on Sep. 11, 2012, and entitled "Circuit for Charge and/or Discharge Protection in an Energy-Storage Device"; U.S. Patent Publication No. US 2007/0224502, published on Sep. 27, 2007, filed as application Ser. No. 11/400,025 on Apr. 6, 2006, patented as U.S. Pat. No. 7,771,870 on Aug. 10, 2010, and entitled "Electrode Protection in Both Aqueous and Non-Aqueous Electrochemical cells, Including Rechargeable Lithium Batteries"; U.S. Patent Publication No. US 2008/0318128, published on Dec. 25, 2008, filed as application Ser. No. 11/821,576 on Jun. 22, 2007, and entitled "Lithium Alloy/Sulfur Batteries"; U.S. Patent Publication No. US 2002/0055040, published on May 9, 2002, filed as application Ser. No. 09/795,915 on Feb. 27, 2001, patented as U.S. Pat. No. 7,939,198 on May 10, 2011, and entitled "Novel Composite Cathodes, Electrochemical Cells Comprising Novel Composite Cathodes, and Processes for Fabricating Same"; U.S. Patent Publication No. US 2006/0238203, published on Oct. 26, 2006, filed as application Ser. No. 11/111,262 on Apr. 20, 2005, patented as U.S. Pat. No. 7,688,075 on Mar. 30, 2010, and entitled "Lithium Sulfur Rechargeable Battery Fuel Gauge Systems and Methods"; U.S. Patent Publication No. US 2008/0187663, published on Aug. 7, 2008, filed as application Ser. No. 11/728,197 on Mar. 23, 2007, patented as U.S. Pat. No. 8,084,102 on Dec. 27, 2011, and entitled "Methods for Co-Flash Evaporation of Polymerizable Monomers and Non-Polymerizable Carrier Solvent/Salt Mixtures/Solutions"; U.S. Patent Publication No. US 2011/0006738, published on Jan. 13, 2011, filed as application Ser. No. 12/679,371 on Sep. 23, 2010, and entitled "Electrolyte Additives for Lithium Batteries and Related Methods"; U.S. Patent Publication No. US 2011/0008531, published on Jan. 13, 2011, filed as application Ser. No. 12/811,576 on Sep. 23, 2010, patented as U.S. Pat. No. 9,034,421 on May 19, 2015, and entitled "Methods of Forming Electrodes Comprising Sulfur and Porous Material Comprising Carbon"; U.S. Patent Publication No. US 2010/0035128, published on Feb. 11, 2010, filed as application Ser. No. 12/535,328 on Aug. 4, 2009, patented as U.S. Pat. No. 9,105,938 on Aug. 11, 2015, and entitled "Application of Force in Electrochemical Cells"; U.S. Patent Publication No. US 2011/0165471, published on Jul. 15, 2011, filed as application Ser. No. 12/180,379 on Jul. 25, 2008, and entitled "Protection of Anodes for Electrochemical Cells"; U.S. Patent Publication No. US 2006/0222954, published on Oct. 5, 2006, filed as application Ser. No. 11/452,445 on Jun. 13, 2006, patented as U.S. Pat. No. 8,415,054 on Apr. 9, 2013, and entitled "Lithium Anodes for Electrochemical Cells"; U.S. Patent Publication No. US 2010/0239914, published on Sep. 23, 2010, filed as application Ser. No. 12/727,862 on Mar. 19, 2010, and entitled "Cathode for Lithium Battery"; U.S. Patent Publication No. US 2010/0294049, published on Nov. 25, 2010, filed as application Ser. No. 12/471,095 on May 22, 2009, patented as U.S. Pat. No. 8,087,309 on Jan. 3, 2012, and entitled "Hermetic Sample Holder and Method for Performing Microanalysis under Controlled Atmosphere Environment"; U.S. Patent Publication No. US 2011/00765560, published on Mar. 31, 2011, filed as application Ser. No. 12/862,581 on Aug. 24, 2010, and entitled "Electrochemical Cells Comprising Porous Structures Comprising Sulfur"; U.S. Patent Publication No. US 2011/0068001, published on Mar. 24, 2011, filed as application Ser. No. 12/862,513 on Aug. 24, 2010, and entitled "Release System for Electrochemical Cells"; U.S. Patent Publication No. US 2012/0048729, published on Mar. 1, 2012, filed as application Ser. No. 13/216,559 on Aug. 24, 2011, and entitled "Electrically Non-Conductive Materials for Electrochemical Cells"; U.S. Patent Publication No. US 2011/0177398, published on Jul. 21, 2011, filed as application Ser. No. 12/862,528 on Aug. 24, 2010, and entitled "Electrochemical Cell"; U.S. Patent Publication No. US 2011/0070494, published on Mar. 24, 2011, filed as application Ser. No. 12/862,563 on Aug. 24, 2010, and entitled "Electrochemical Cells Comprising Porous Structures Comprising Sulfur"; U.S. Patent Publication No. US 2011/0070491, published on Mar. 24, 2011, filed as application Ser. No. 12/862,551 on Aug. 24, 2010, and entitled "Electrochemical Cells Comprising Porous Structures Comprising Sulfur"; U.S. Patent Publication No. US 2011/0059361, published on Mar. 10, 2011, filed as application Ser. No. 12/862,576 on Aug. 24, 2010, patented as U.S. Pat. No. 9,005,009 on Apr. 14, 2015, and entitled "Electrochemical Cells Comprising Porous Structures Comprising Sulfur"; U.S. Patent Publication No. US 2012/0070746, published on Mar. 22, 2012, filed as application Ser. No. 13/240,113 on Sep. 22, 2011, and entitled "Low Electrolyte Electrochemical Cells"; U.S. Patent Publication No. US 2011/0206992, published on Aug. 25, 2011, filed as application Ser. No. 13/033,419 on Feb. 23, 2011, and entitled "Porous Structures for Energy Storage Devices"; U.S. Patent Publication No. 2013/0017441, published on Jan. 17, 2013, filed as application Ser. No. 13/524,662 on Jun. 15, 2012, patented as U.S. Pat. No. 9,548,492 on Jan. 17, 2017, and entitled "Plating Technique for Electrode"; U.S. Patent Publication No. US 2013/0224601, published on Aug. 29, 2013, filed as application Ser. No. 13/766,862 on Feb. 14, 2013, patented as U.S. Pat. No. 9,077,041 on Jul. 7, 2015, and entitled "Electrode Structure for Electrochemical Cell"; U.S. Patent Publication No. US 2013/0252103, published on Sep. 26, 2013, filed as application Ser. No. 13/789,783 on Mar. 8, 2013, patented as U.S. Pat. No. 9,214,678 on Dec. 15, 2015, and entitled "Porous Support Structures, Electrodes Containing Same, and Associated Methods"; U.S. Patent Publication No. US 2013/0095380, published on Apr. 18, 2013, filed as application Ser. No. 13/644,933 on Oct. 4, 2012, patented as U.S. Pat. No. 8,936,870 on Jan. 20, 2015, and entitled "Electrode Structure and Method for Making the Same"; U.S. Patent Publication No. US 2014/0123477, published on May 8, 2014, filed as application Ser. No. 14/069,698 on Nov. 1, 2013, patented as U.S. Pat. No. 9,005,311 on Apr. 14, 2015, and entitled "Electrode Active Surface Pretreatment"; U.S. Patent Publication No. US 2014/0193723, published on Jul. 10, 2014, filed as application Ser. No. 14/150,156 on Jan. 8, 2014, patented as U.S. Pat. No. 9,559,348 on Jan. 31, 2017, and entitled "Conductivity Control in Electrochemical Cells"; U.S. Patent Publication No. US 2014/0255780, published on Sep. 11, 2014, filed as application Ser. No. 14/197,782 on Mar. 5, 2014, patented as U.S. Pat. No. 9,490,478 on Nov. 6, 2016, and entitled "Electrochemical Cells Comprising Fibril Materials"; U.S. Patent Publication No. US 2014/0272594, published on Sep. 18, 2014, filed as application Ser. No. 13/833,377 on Mar. 15, 2013, and entitled "Protective Structures for Electrodes"; U.S. Patent Publication No. US 2014/0272597, published on Sep. 18, 2014, filed as application Ser. No. 14/209,274 on Mar. 13, 2014, and entitled "Protected Electrode Structures and Methods"; U.S. Patent Publication No. US 2014/0193713, published on Jul. 10, 2014, filed as application Ser. No. 14/150,196 on Jan. 8, 2014, patented as U.S. Pat. No. 9,531,009 on Dec. 27, 2016, and entitled "Passivation of Electrodes in Electrochemical Cells"; U.S. Patent Publication No. US 2014/0272565, published on Sep. 18, 2014, filed as application Ser. No. 14/209,396 on Mar. 13, 2014, and entitled "Protected Electrode Structures"; U.S. Patent Publication No. US 2015/0010804, published on Jan. 8, 2015, filed as application Ser. No. 14/323,269 on Jul. 3, 2014, and entitled "Ceramic/Polymer Matrix for Electrode Protection in Electrochemical Cells, Including Rechargeable Lithium Batteries"; U.S. Patent Publication No. US 2015/044517, published on Feb. 12, 2015, filed as application Ser. No. 14/455,230 on Aug. 8, 2014, and entitled "Self-Healing Electrode Protection in Electrochemical Cells"; U.S. Patent Publication No. US 2015/0236322, published on Aug. 20, 2015, filed as application Ser. No. 14/184,037 on Feb. 19, 2014, and entitled "Electrode Protection Using Electrolyte-Inhibiting Ion Conductor"; and U.S. Patent Publication No. US 2016/0072132, published on Mar. 10, 2016, filed as application Ser. No. 14/848,659 on Sep. 9, 2015, and entitled "Protective Layers in Lithium-Ion Electrochemical Cells and Associated Electrodes and Methods".

U.S. Provisional Patent Application No. 62/469,184, filed Mar. 9, 2017, and entitled "Electrochemical Cells Comprising Short-Circuit Resistant Electronically Insulating Regions" is incorporated herein by reference in its entirety for all purposes.

The following examples are intended to illustrate certain embodiments of the present invention, but do not exemplify the full scope of the invention.

EXAMPLES

In Examples 1-3, unless otherwise noted, electrochemical cells were prepared by the following methods: a Li metal anode was vacuum deposited on a Celgard 2400 separator or a Celgard 2400 separator pre-coated with a Li protective layer. The anode-coated separator was then assembled in a layered structure with one of the following configurations: anode-coated separator/second separator/cathode or anode-coated separator/cathode. The cathode was lithium iron phosphate (LFP). The dimensions of anode-coated separator were 5 cm×4.345 cm; the dimensions of cathode were 4.5 cm×3.683 cm, corresponding to total active surface area of 16.5735 $cm^2$. The second separator, when present, had dimensions of 5 cm×4.445 cm. After sealing the cell components in a foil pouch, 0.3 mL of Li-ion electrolyte was added. The cell package was then vacuum sealed. The cells were allowed to soak in the electrolyte for 24 hours unrestrained, and then 10 kg/$cm^2$ pressure was applied. The cells were then cycled under 10 kg/$cm^2$ of pressure. Charge and discharge cycling was performed at standard C/8 (2.5 mA) and C/5 (4 mA) rates, respectively, with a charge cutoff voltage of 4.2 V followed by a taper at 4.2 V to 0.5 mA, and a discharge cutoff at 2.5 V.

Example 1

Figure 8:
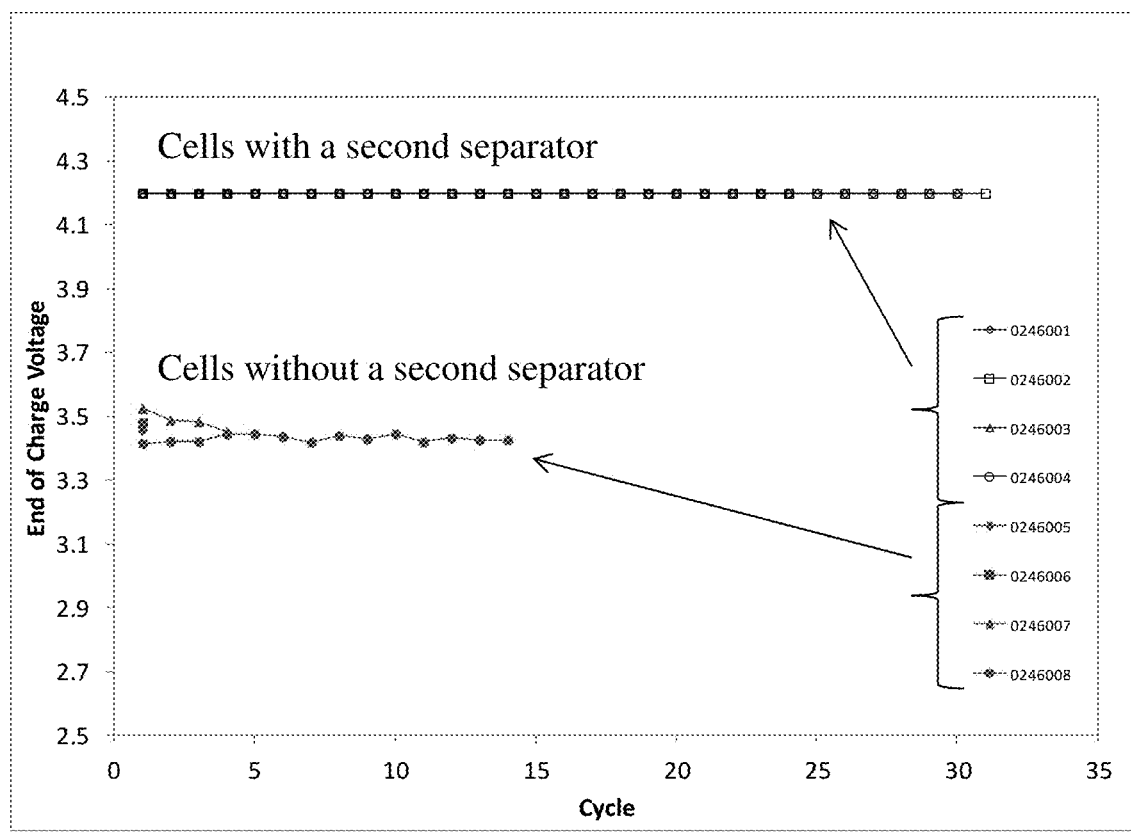
FIG. 8 shows, in accordance with some embodiments, the end of cycle voltage for certain electrochemical cells.
Figure 9:
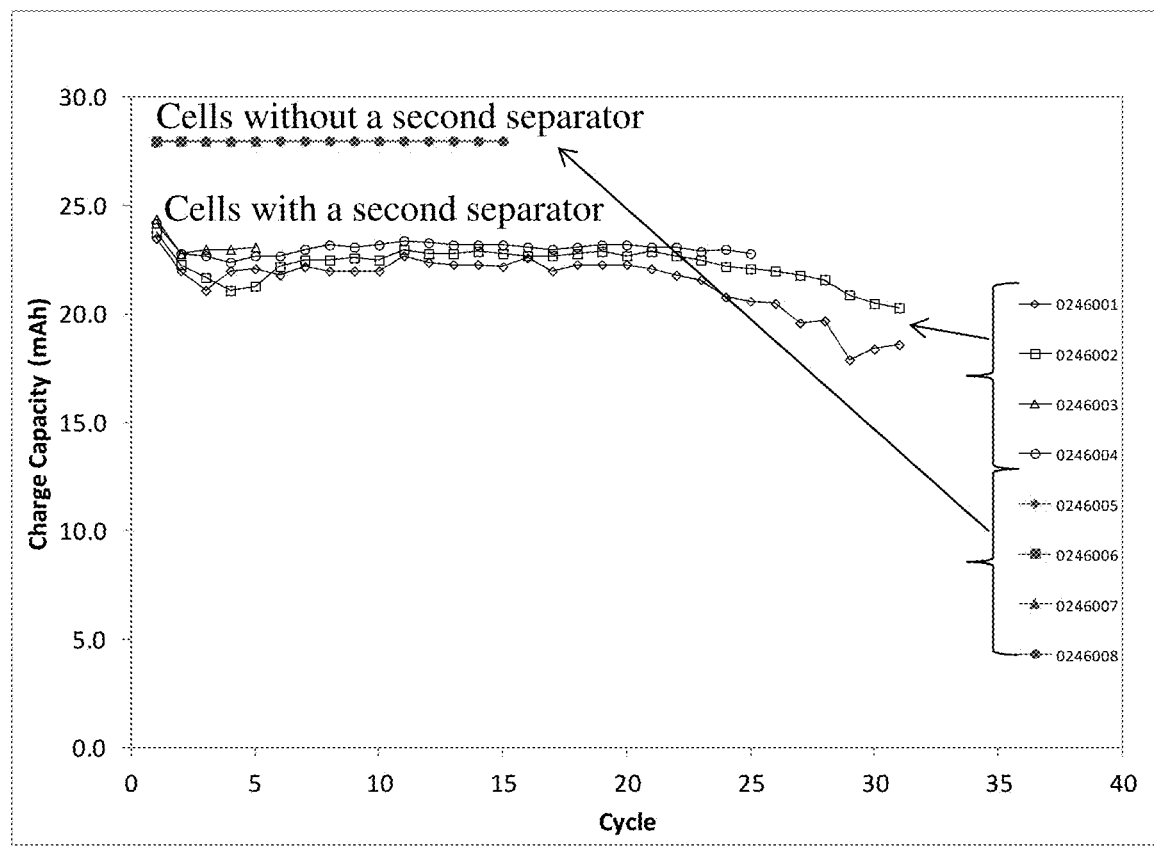
FIG. 9 shows, in accordance with some embodiments, the charge capacity for certain electrochemical cells.
Figure 10:
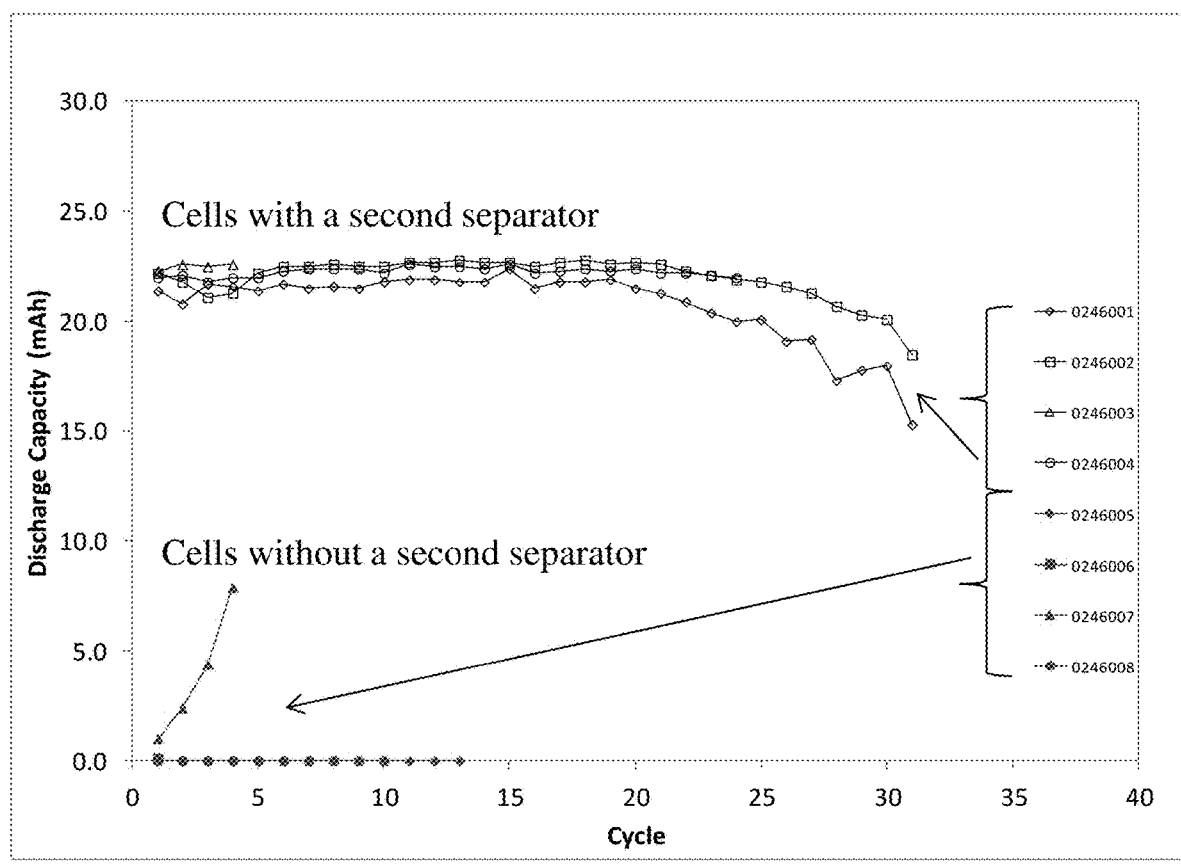
FIG. 10 shows, in accordance with some embodiments, the discharge capacity for certain electrochemical cells.

15 microns of Li was vacuum deposited on a Celgard 2400 separator; the coated separator was then assembled into the cells as described above with or without a second separator, Celgard 2325. The electrolyte was LP30 purchased from BASF, which contains 1M lithium hexafluorophosphate ($LiPF_6$) in a 1:1 weight ratio mixture of dimethyl carbonate (DMC) and ethylene carbonate (EC). The cells without the second separator were shorted at first charge, as indicated by inability of these cells to reach the charge voltage cut-off of 4.2 V (FIG. 8), timed-out charge capacity (FIG. 9) and very low, close to zero in some cases, discharge capacity (FIG. 10). The cells with a second separator did not short.

Example 2

Figure 11:
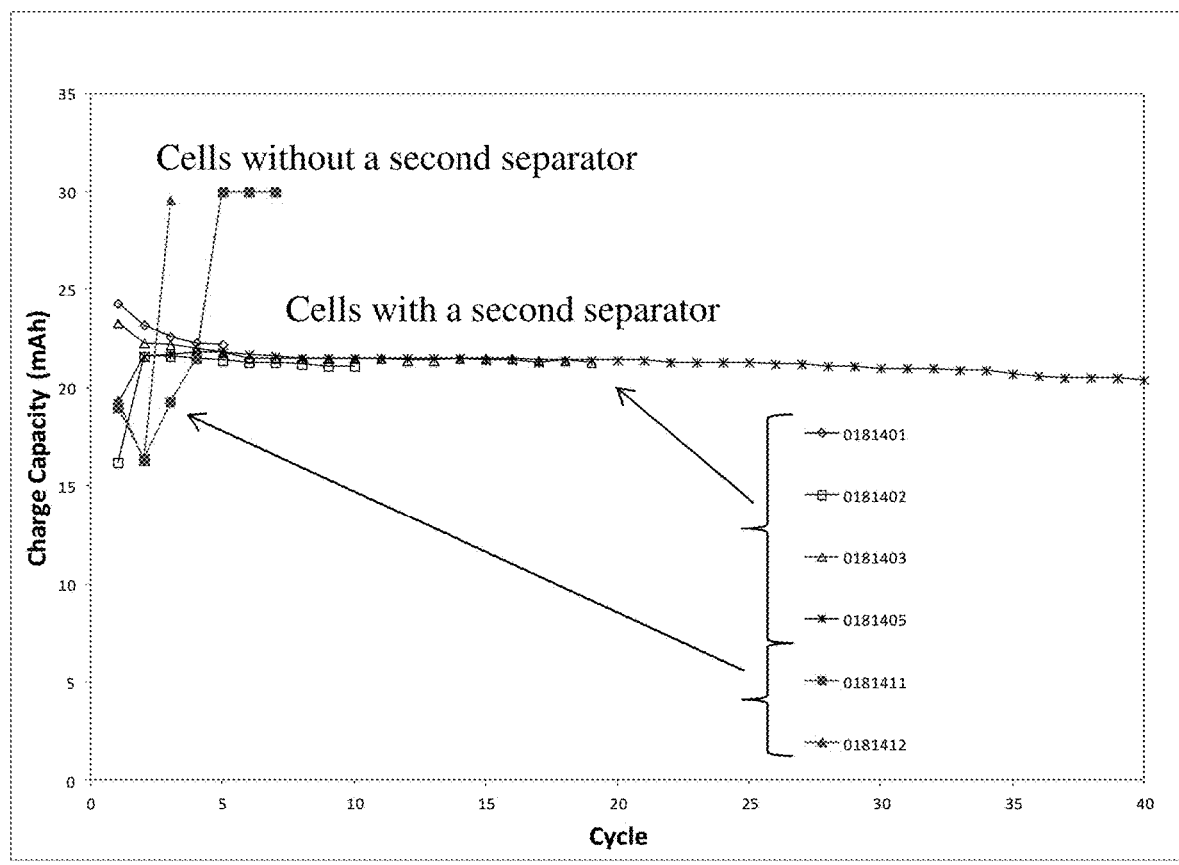
FIG. 11 shows, in accordance with certain embodiments, the charge capacity for certain electrochemical cells.
Figure 12:
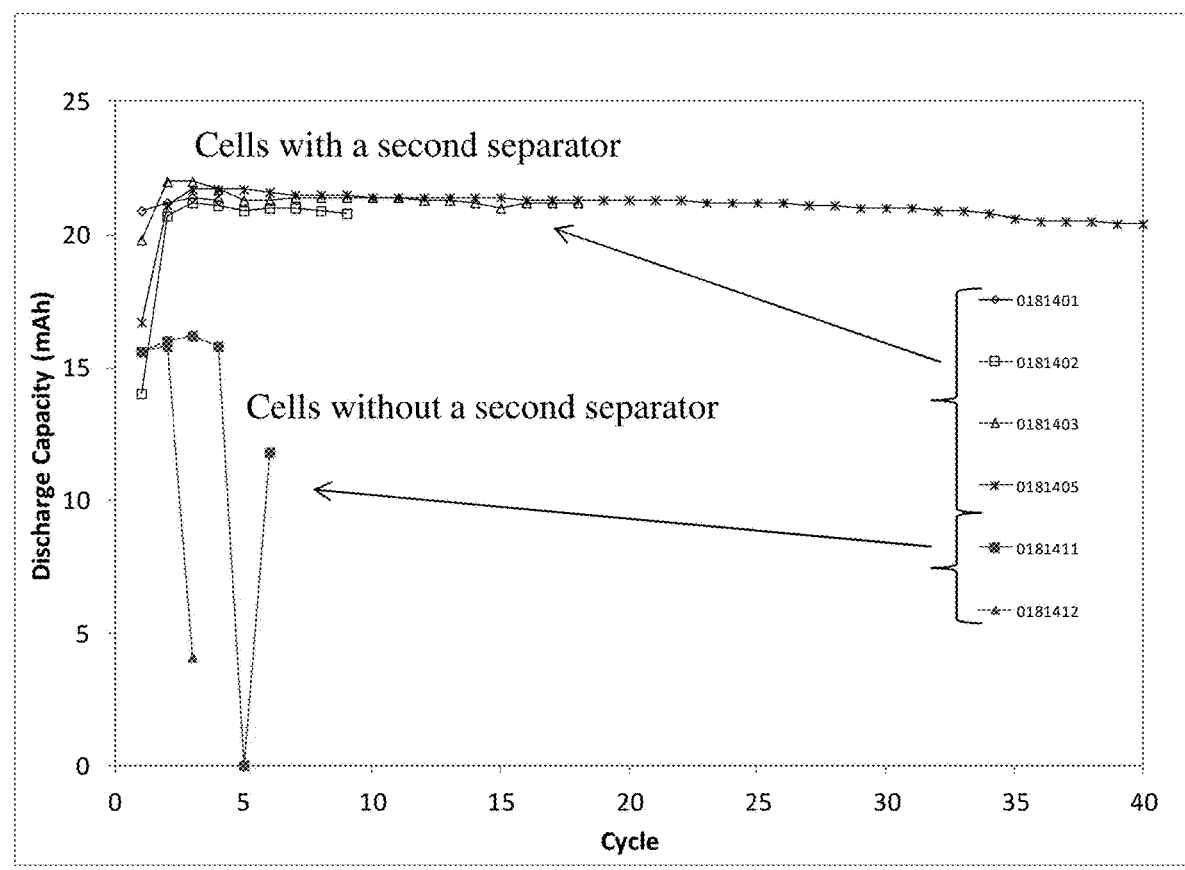
FIG. 12 shows, in accordance with certain embodiments, the discharge capacity for certain electrochemical cells.

25 microns of Li was vacuum deposited on a Celgard 2400 separator that was pre-coated with a porous lithium protective layer; the coated separator was then assembled into the cells as described above with or without a second separator, Celgard 2325. The electrolyte was 16 wt % lithium bis(trifluoromethane sulfonyl) imide (LiTFSi), and 4 wt % lithium nitrate in 1:1 weight ratio mixture of 1,3-dioxalane (DOL) and dimethoxyethane (DME). Both charge and discharge cycling were performed at C/8 (2.5 mA) rate with a charge cutoff voltage of 3.5 V, followed by a taper at 3.5 V to 0.5 mA with a discharge cutoff at 3.25 V. The cells that did not have the second separator showed signs of shorting at as early as the second cycle, as indicated by the timed-out charge capacity (FIG. 11) and low discharge capacity (FIG. 12). The cells without the second separator also had 100% self discharge after resting for 24 hours after the $5^{th}$ charge (the $5^{th}$ discharge capacity was zero). In comparison, the cells with the second separator showed normal cycling performance and less than 0.5% self discharge after resting for 24 hours after the $5^{th}$ charge.

Example 3

15 microns of Li was vacuum deposited on a Celgard 2400 separator; the coated separator was then assembled into the cells as described above, except that the cell components were assembled in stacked three-layer structures of anode-coated separator/cathode/anode-coated separator/anode or anode-coated separator/second separator/cathode/second separator/anode-coated separator. The total active surface area was 100 cm². After sealing the cell components in a foil pouch, the electrolyte, 0.7 mL of a 4 wt % $LiNO_3$ suspension in LP30, was added. Regardless of cycling conditions, the cells that did not have the second separators have a much higher tendency to short. As shown in Table 1, 4 out of the 6 cells with only one separator were shorted, while none of the cells with two layer of separators were shorted during cycling.

TABLE 1

Cycle performance of cells with or without a second separator under various charge and discharge conditions.

| Second separator (yes/no) | Charge-discharge rate (C = 137 mA) | Number of cycles to 80% capacity | Cell failure due to shorting (yes/no) |
|---|---|---|---|
| No | C/8-C/5 | 3 | Yes |
| No | C/8-C/5 | 150 | Yes |
| No | C/3-C/3 | 1 | Yes |
| No | C/3-C/3 | 46 | No |
| No | 80% DST* | 5 | Yes |
| No | 80% DST* | 199 | No |
| Yes | C/8-C/5 | 132 | No |
| Yes | C/8-C/5 | 148 | No |
| Yes | C/3-C3 | 56 | No |
| Yes | C/3-C/3 | 49 | No |
| Yes | 80% DST | 198 | No |
| Yes | 80% DST | 304 | No |

*As would be known to one of ordinary skill in the art, an 80% DST charge-discharge rate refers to performing the procedure described in the USABC standard for DST testing conditions performed to 80% of the cell's initial capacity.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrochemical cell, comprising:
    a first electrode comprising metallic lithium as an electrode active material;
    a second electrode;
    a liquid-containing electrolyte; and
    an electronically insulating region between the first electrode and the second electrode, the electronically insulating region mechanically separable from the first and second electrodes, the electronically insulating region comprising:
        a first electronically insulating layer;
        a second electronically insulating layer; and
        an interface between the first electronically insulating layer and the second electronically insulating layer;
    wherein at least 5% of the volume of the first electronically insulating layer is occupied by the electrolyte and at least 5% of the volume of the second electronically insulating layer is occupied by the electrolyte;
    wherein at least 5% of the area of the first electronically insulating layer at the interface between the first electronically insulating layer and the second electronically insulating layer is not mechanically separable from the second electronically insulating layer; and
    wherein the interface between the first electronically insulating layer and the second electronically insulating layer comprises a portion over which the first electronically insulating layer is mechanically separable from the second electronically insulating layer through application of a force with a magnitude of less than 5 N/mm.

2. An electrochemical cell, comprising:
    a first electrode comprising metallic lithium as an electrode active material;
    a second electrode; and
    an electronically insulating region between the first electrode and the second electrode, the electronically insulating region mechanically separable from the first and second electrodes, the electronically insulating region comprising:
        a first electronically insulating layer;
        a second electronically insulating layer; and
        an interface between the first electronically insulating layer and the second electronically insulating layer;
    wherein the ionic conductivity of the second electronically insulating layer is within 10% of the ionic conductivity of the first electronically insulating layer;
    wherein at least 5% of the area of the first electronically insulating layer at the interface between the first electronically insulating layer and the second electronically insulating layer is not mechanically separable from the second electronically insulating layer; and
    wherein the interface between the first electronically insulating layer and the second electronically insulating layer comprises a portion over which the first electronically insulating layer is mechanically separable from the second electronically insulating layer through application of a force with a magnitude of less than 5 N/mm.

3. The electrochemical cell of claim 1, wherein the first electronically insulating layer and the second electronically insulating layer are in direct contact.

4. The electrochemical cell of claim 1, wherein one or more intervening layers is present between the first electronically insulating layer and the second electronically insulating layer.

5. The electrochemical cell of claim 1, wherein the electronically insulating region comprises a polymer.

6. The electrochemical cell of claim 1, wherein at least one of the first electronically insulating layer and the second electronically insulating layer comprises a polymer.

7. The electrochemical cell of claim 1, wherein each of the first electronically insulating layer and the second electronically insulating layer comprises a polymer.

8. The electrochemical cell of claim 1, wherein the electronically insulating region comprises pores.

9. The electrochemical cell of claim 1, wherein at least one of the first electronically insulating layer and the second electronically insulating layer comprises pores.

10. The electrochemical cell of claim 1, wherein both the first electronically insulating layer and the second electronically insulating layer comprise pores.

11. The electrochemical cell of claim 8, wherein at least 50% of the pore volume is made up of pores having cross-sectional diameters of greater than or equal to 0.001 microns.

12. The electrochemical cell of claim 8, wherein the at least 50% of the pore volume is made up of pores having cross-sectional diameters of greater than or equal to 0.001 microns and less than or equal to 0.5 microns.

13. The electrochemical cell of claim 8, wherein at least a portion of the pores extend from one external surface of the electronically insulating region to a second, opposite external surface of the electronically insulating region.

14. The electrochemical cell of claim 1, wherein the electronically insulating region does not qualify as a gel.

15. The electrochemical cell of claim 1, wherein the electronically insulating region has an ionic conductivity greater than or equal to $10^{-4}$ S/cm.

16. The electrochemical cell of claim 1, wherein the first electrode comprises a lithium alloy.

17. The electrochemical cell of claim 1, wherein the second electrode comprises sulfur.

18. The electrochemical cell of claim 1, wherein the second electrode comprises a lithium-intercalation electrode.

19. The electrochemical cell of claim 1, wherein the first electrode comprises a layer of lithium metal.

20. The electrochemical cell of claim 1, wherein the electronically insulating region comprises exactly two electronically insulating layers.

21. The electrochemical cell of claim 1, wherein the first electronically insulating layer and the second electronically insulating layer can be separated across at least 50% of the interface between the first electronically insulating layer and the second electronically insulating layer through application of a force with a magnitude of less than 5 N/mm.

22. The electrochemical cell of claim 1, wherein the first electronically insulating layer and the second electronically insulating layer can be separated across at least 90% of the interface between the first electronically insulating layer and the second electronically insulating layer through application of a force with a magnitude of less than 5 N/mm.

23. The electrochemical cell of claim 1, further comprising a lithium metal dendrite within the portion of the interface between the first electronically insulating layer and the second electronically insulating layer over which the first electronically insulating layer is mechanically separable from the second electronically insulating layer through application of a force with a magnitude of less than 5 N/mm.

24. The electrochemical cell of claim 2, wherein the first electronically insulating layer and the second electronically insulating layer can be separated across at least 50% of the interface between the first electronically insulating layer and the second electronically insulating layer through application of a force with a magnitude of less than 1 N/mm.

25. The electrochemical cell of claim 2, wherein the first electronically insulating layer and the second electronically insulating layer can be separated across at least 90% of the interface between the first electronically insulating layer and the second electronically insulating layer through application of a force with a magnitude of less than 1 N/mm.

26. The electrochemical cell of claim 2, wherein the electronically insulating region comprises a polymer.

27. The electrochemical cell of claim 2, wherein the electronically insulating region comprises pores.

28. The electrochemical cell of claim 2, wherein the first electrode comprises a lithium alloy.

29. The electrochemical cell of claim 2, wherein the second electrode comprises a lithium-intercalation electrode.

30. The electrochemical cell of claim 2, wherein the first electrode comprises a layer of lithium metal.

\* \* \* \* \*